(12) United States Patent
Hosseini et al.

(10) Patent No.: US 10,396,943 B2
(45) Date of Patent: Aug. 27, 2019

(54) ASYMMETRIC DOWNLINK-UPLINK TRANSMISSION TIME INTERVAL CONFIGURATIONS FOR LOW LATENCY OPERATION

(71) Applicant: QUALCOMM Incorporated, San Diego, CA (US)

(72) Inventors: Seyedkianoush Hosseini, San Diego, CA (US); Wanshi Chen, San Diego, CA (US); Jing Sun, San Diego, CA (US); Shimman Arvind Patel, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/841,278

(22) Filed: Dec. 13, 2017

(65) Prior Publication Data

US 2018/0167172 A1 Jun. 14, 2018

Related U.S. Application Data

(60) Provisional application No. 62/433,997, filed on Dec. 14, 2016.

(51) Int. Cl.
*H04L 1/18* (2006.01)
*H04W 72/12* (2009.01)
(Continued)

(52) U.S. Cl.
CPC .......... *H04L 1/1887* (2013.01); *H04L 1/1812* (2013.01); *H04L 1/1825* (2013.01);
(Continued)

(58) Field of Classification Search
CPC ... H04L 1/1812; H04L 1/1825; H04L 1/1854; H04L 1/1887; H04L 23/00; H04L 5/001;
(Continued)

(56) References Cited

U.S. PATENT DOCUMENTS

2009/0006925 A1* 1/2009 Pan ................ H04L 1/1861
714/758
2012/0008609 A1* 1/2012 Ma ................ H04B 7/0404
370/338
(Continued)

OTHER PUBLICATIONS

Ericsson: "On Reduced Processing Time for Short TTI", 3GPP Draft; R1-1613394, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 19, 2016, XP051191254, Retrieved from the Internet: URL:http://www.3gpp.org/ftp/tsg_ran/WG1_RL1/TSGR1_87/Docs/ [retrieved on Nov. 19, 2016], 8 pages.
(Continued)

*Primary Examiner* — Stephen J Clawson
(74) *Attorney, Agent, or Firm* — Holland & Hart LLP

(57) ABSTRACT

Methods, systems, and devices for wireless communication are described that identify an uplink transmission time interval (TTI) length for uplink transmissions, and a downlink TTI length for downlink transmissions, in which the uplink TTI length and the downlink TTI length may be different. The downlink TTI length may be a shortened TTI (sTTI) length, and the uplink TTI length may be longer than the downlink sTTI length. Various parameters for transmissions may be determined based on one or more of the uplink TTI length or the downlink TTI length, such as one or more of a feedback process transmission timing, a timing advance (TA) value, a transport block size (TBS), a number of spatial layers, a number of component carriers (CCs), or a channel quality information (CQI) reporting type may be determined based on one or more of the uplink TTI length or the downlink TTI length.

28 Claims, 16 Drawing Sheets

(51) Int. Cl.
*H04L 23/00* (2006.01)
*H04W 56/00* (2009.01)
*H04W 72/04* (2009.01)
*H04L 5/00* (2006.01)

(52) U.S. Cl.
CPC ............ *H04L 1/1854* (2013.01); *H04L 23/00* (2013.01); *H04W 56/0045* (2013.01); *H04W 72/1215* (2013.01); *H04L 5/001* (2013.01); *H04L 5/0055* (2013.01); *H04W 72/0406* (2013.01)

(58) Field of Classification Search
CPC ............ H04L 5/0055; H04W 56/0045; H04W 72/0406; H04W 72/1215
USPC .......................................................... 370/336
See application file for complete search history.

(56) References Cited

U.S. PATENT DOCUMENTS

| | | | |
|---|---|---|---|
| 2016/0119948 A1 | 4/2016 | Damnjanovic et al. | |
| 2016/0128039 A1 | 5/2016 | Lim et al. | |
| 2016/0323070 A1 | 11/2016 | Chen et al. | |
| 2017/0289985 A1* | 10/2017 | Yang | H04W 52/146 |
| 2017/0332397 A1* | 11/2017 | Li | H04L 1/1861 |
| 2017/0339675 A1* | 11/2017 | Liu | H04L 5/0051 |
| 2018/0242389 A1* | 8/2018 | Phuyal | H04W 72/042 |
| 2018/0316468 A1* | 11/2018 | Kishiyama | H04W 28/04 |

OTHER PUBLICATIONS

Interdigital Communications; "On Processing Time Reduction for sTTI", 3GPP Draft; R1-167657__STTI_PROCESSING_TIME, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016, XP051126006, Retrieved from the Internet: URL:http://www.3gpp.org/ftp/Meetings_3GPP_SYNC/RAN1/Docs/ [retrieved on Aug. 21, 2016], 3 pages.
International Search Report and Written Opinion—PCT/US2017/066280—ISA/EPO—dated Mar. 19, 2018.
NTT Docomo et al., "Views on Processing Time Reduction and Related Procedures", 3GPP Draft; R1-1610049, 3rd Generation Partnership Project (3GPP), Mobile Competence Centre; 650, Route Des Lucioles, F-06921 Sophia-antipolis Cedex; France, vol. RAN WG1, No. Lisbon, Portugal; Oct. 10, 2016-Oct. 14, 2016 Oct. 9, 2016, XP051150074, Retrieved from the Internet: URL:http://www.3gpp.org/ftp/Meetings_3GPP_SYNC/RAN1/Docs/ [retrieved on Oct. 9, 2016], 7 pages.
Qualcomm Incorporated; "sTTI Operation", 3GPP Draft; R1-1611637, 3rd Generation Partnership Project (3GPP), Mobile Competence Centre, 650, Route Des Lucioles, F-06921 Sophia-Antipolis Cedex, France, vol. RAN WG1, No. Reno. Nevada, USA; Nov. 5, 2016, XP051190043, Retrieved from the Internet: URL:http://www.3gpp.org/ftp/tsg_ran/WG1_RL1/TSGR1_87/Docs/ [retrieved on Nov. 5, 2016],6 pages.

* cited by examiner

ASYMMETRIC DOWNLINK-UPLINK TRANSMISSION TIME INTERVAL CONFIGURATIONS FOR LOW LATENCY OPERATION

CROSS REFERENCES

The present application for patent claims priority to U.S. Provisional Patent Application No. 62/433,997 by Hosseini et al., entitled "Asymmetric Downlink Uplink Transmission Time Interval Configurations For Low Latency Operation," filed Dec. 14, 2016, assigned to the assignee hereof.

BACKGROUND

The following relates generally to wireless communication, and more specifically to asymmetric downlink-uplink transmission time interval (TTI) configurations for low latency operation.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use orthogonal frequency division multiple access (OFDMA) on the downlink, single-carrier frequency division multiple access (SC-FDMA) on the uplink, and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5th Generation (5G) network), a wireless multiple access communication system may include a number of smart radio heads (RHs) in communication with a number of access node controllers (ANCs), where a set of one or more RHs, in communication with an ANC, defines a base station (e.g., an eNB or giga-nodeB (gNB)). A base station may communicate with a set of UEs on downlink channels (e.g., for transmissions from a base station to a UE) and uplink channels (e.g., for transmissions from a UE to a base station).

A base station in some LTE or NR deployments may transmit to one or more UEs using different length TTIs that may be reduced in length relative to legacy LTE TTIs. Such a reduced length TTI may be referred to as a shortened TTI (sTTI) and users communicating using sTTIs may be referred to as low latency users. An sTTI may be a subset of one or more subframes that correspond to legacy TTI subframes. A base station may allocate transmission resources for sTTIs to a UE that may include time resources, frequency resources, and one or more component carriers (CCs) to be used for sTTI transmissions. Efficient allocation of such resources for data, control information, and reference signal transmissions may help to increase the efficiency of a wireless communications system.

SUMMARY

The described techniques relate to improved methods, systems, devices, or apparatuses that support asymmetric downlink-uplink transmission time interval (TTI) configurations for low latency operation. Generally, the described techniques provide for identifying an uplink TTI length for uplink transmissions, and a downlink TTI length for downlink transmissions, in which the uplink TTI length and the downlink TTI length may be different. For example, the downlink TTI length may be a shortened TTI (sTTI) length, and the uplink TTI length may be longer than the downlink sTTI length (e.g., a longer sTTI or a 1 ms TTI). Various parameters for transmissions between a user equipment (UE) and a base station may be determined based on one or more of the uplink TTI length or the downlink TTI length. For example, one or more of a feedback process (e.g., a hybrid automatic repeat request (HARQ) process) transmission timing, a timing advance (TA) value, a transport block size (TBS), a number of spatial layers, a number of component carriers (CCs), or a channel quality information (CQI) reporting type for uplink and/or downlink transmissions may be determined based on one or more of the uplink TTI length or the downlink TTI length.

In some examples, a downlink HARQ timing may be based on the downlink TTI length, and a timing between receipt of HARQ feedback and responsive transmissions or retransmissions of data may be based on the uplink TTI length. In other examples, the downlink HARQ timing may be based on the downlink TTI length, and the timing between receipt of HARQ feedback and responsive transmissions or retransmissions of data may also be based on the downlink TTI length. In some cases, a timing for transmission of HARQ feedback or timing of the responsive transmissions or retransmissions may be shifted to provide that the transmission aligns with a TTI or sTTI boundary. In some cases, the downlink sTTI length may be shorter than the uplink sTTI or TTI length, and HARQ feedback information may be grouped and transmitted according to the downlink HARQ timing.

In some examples, a TA value may be determined based on the downlink TTI length, and a maximum TA value may be identified. Other parameters, such as a TBS, number of spatial layers, number of CCs, or CQI reporting type may be identified based at least in part on the maximum TA value. In some cases, an uplink control channel transmission may include HARQ feedback for two or more downlink sTTIs, and coding (e.g., Reed-Muller coding or Turbo coding) may be used to code HARQ feedback. In some cases, the TA value may be determined based on the uplink sTTI or TTI length, and processing timing (e.g., HARQ feedback transmission timing) may be based on the uplink sTTI or TTI length.

A method of wireless communication is described. The method may include identifying a first TTI length for downlink transmissions, identifying a second TTI length for uplink transmissions, the second TTI length being different than the first TTI length, determining one or more of a feedback process transmission timing or a TA value based at least in part on one or more of the first TTI length or the second TTI length, and transmitting a subsequent transmission according to one or more of the feedback process transmission timing or the TA value.

An apparatus for wireless communication is described. The apparatus may include means for identifying a first TTI length for downlink transmissions, means for identifying a second TTI length for uplink transmissions, the second TTI length being different than the first TTI length, means for determining one or more of a feedback process transmission timing or a TA value based at least in part on one or more of the first TTI length or the second TTI length, and means for transmitting a subsequent transmission according to one or more of the feedback process transmission timing or the TA value.

Another apparatus for wireless communication is described. The apparatus may include a processor, memory in electronic communication with the processor, and instructions stored in the memory. The instructions may be operable to cause the processor to identify a first TTI length for downlink transmissions, identify a second TTI length for uplink transmissions, the second TTI length being different than the first TTI length, determine one or more of a feedback process transmission timing or a TA value based at least in part on one or more of the first TTI length or the second TTI length, and transmit a subsequent transmission according to one or more of the feedback process transmission timing or the TA value.

A non-transitory computer readable medium for wireless communication is described. The non-transitory computer-readable medium may include instructions operable to cause a processor to identify a first TTI length for downlink transmissions, identify a second TTI length for uplink transmissions, the second TTI length being different than the first TTI length, determine one or more of a feedback process transmission timing or a TA value based at least in part on one or more of the first TTI length or the second TTI length, and transmit a subsequent transmission according to one or more of the feedback process transmission timing or the TA value.

In some examples of the method, apparatus, and non-transitory computer-readable medium described above, a HARQ feedback process timing for transmitting acknowledgment/negative-acknowledgment (ACK/NACK) feedback in the subsequent transmission may be determined based on the first TTI length for downlink transmissions. In some examples of the method, apparatus, and non-transitory computer-readable medium described above, a start time for the subsequent transmission may be shifted to align with a start of an uplink TTI having the second TTI length.

In some examples of the method, apparatus, and non-transitory computer-readable medium described above, a HARQ process timing for transmitting a new transmission or a retransmission in the subsequent transmission may be determined based on the second TTI length. In some examples of the method, apparatus, and non-transitory computer-readable medium described above, a first HARQ process timing for transmitting a new transmission or a retransmission may be determined based on the first TTI length.

Some examples of the method, apparatus, and non-transitory computer-readable medium described above may further include processes, features, means, or instructions for shifting a start time for the subsequent transmission that includes the new transmission or retransmission to align with a start of a downlink TTI having the first TTI length.

Some examples of the method, apparatus, and non-transitory computer-readable medium described above may further include processes, features, means, or instructions for determining a second HARQ feedback process timing for transmitting HARQ ACK/NACK feedback based on the first TTI length for downlink transmissions, and wherein the first HARQ process timing and the second HARQ process timing for starting the subsequent transmission may be based on different integer numbers of first TTI lengths.

In some examples of the method, apparatus, and non-transitory computer-readable medium described above, the first TTI length may be shorter than the second TTI length, and wherein ACK/NACK feedback for two or more downlink transmissions may be grouped and transmitted in a single subsequent transmission.

In some examples of the method, apparatus, and non-transitory computer-readable medium described above, one or more parameters for the subsequent transmission may be determined based at least in part on the first TTI length, where the one or more parameters for the subsequent transmission include one or more of the TA value of the subsequent transmission, a TBS, a number of spatial layers for the subsequent transmission, a number of CCs to carry the subsequent transmission, or a CQI reporting type.

In some examples of the method, apparatus, and non-transitory computer-readable medium described above, the TA value for the subsequent transmission may be determined based on the second TTI length. In some examples of the method, apparatus, and non-transitory computer-readable medium described above, the first TTI length may be shorter than the second TTI length, and wherein feedback information for two or more downlink transmissions may be grouped for transmission in the subsequent transmission. In some examples of the method, apparatus, and non-transitory computer-readable medium described above, the two or more downlink transmissions may be in different subframes and the feedback information may be grouped across the different subframes. In some examples of the method, apparatus, and non-transitory computer-readable medium described above, the grouped feedback information may be coded for transmission in the subsequent transmission according to a Reed-Muller (RM) coding technique or a turbo coding technique.

In some examples of the method, apparatus, and non-transitory computer-readable medium described above, the second TTI length may be selected based at least in part on a channel condition for the uplink transmissions. In some examples of the method, apparatus, and non-transitory computer-readable medium described above, a HARQ process timing or a timing between an uplink grant and the uplink transmissions may be determined based at least in part on the TA value.

DETAILED DESCRIPTION

Figure 1:
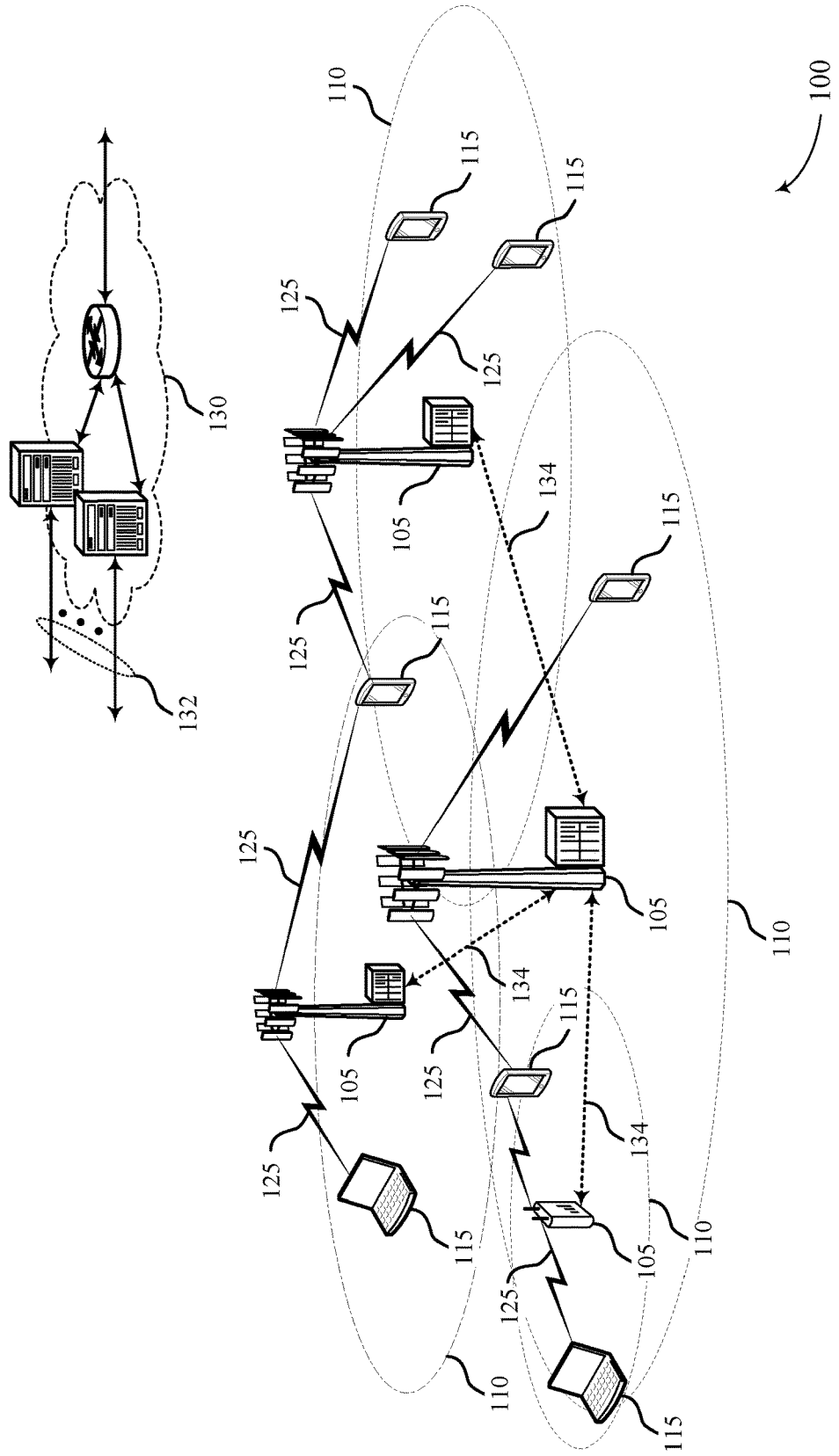
FIG. 1 illustrates an example of a system for wireless communication that supports asymmetric downlink-uplink transmission time interval (TTI) configurations for low latency operation in accordance with aspects of the present disclosure.

The described techniques relate to improved methods, systems, devices, or apparatuses that support wireless transmissions in systems that may have asymmetric transmission time intervals (TTIs) for uplink and downlink transmissions. Some transmissions may use shortened TTIs (sTTIs) for uplink or downlink transmissions, in which a length of the sTTI may be shorter than a legacy Long Term Evolution (LTE) TTI or a 1 ms TTI, and in which uplink transmissions and downlink transmissions may use different length TTIs or sTTIs. Resources allocated for sTTI transmissions may be used for uplink and/or downlink communications that are relatively latency sensitive, referred to as low latency communications, relative to communications that may be relatively latency insensitive, such as enhanced mobile broadband (eMBB) transmissions that may use a 1 ms (or legacy LTE) TTI duration. In some cases, an sTTI duration may correspond to one slot of a wireless subframe, or to two or three orthogonal frequency division multiplexing (OFDM) symbols, for example, and a 1 ms TTI duration may correspond to a duration of a 1 ms subframe.

Such low latency communications may be used in systems, for example, that may support multiple different services for data communications. Such different services may be selected depending upon the nature of the communications. For example, communications that require low latency and high reliability, sometimes referred to as mission critical communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

The present disclosure describes various techniques with reference to next generation networks (e.g., 5th Generation (5G) or new radio (NR) networks) that are being designed to support features such as high bandwidth operations, more dynamic subframe/slot types, and self-contained subframe/slot types (in which hybrid automatic repeat request (HARQ) feedback for a subframe/slot may be transmitted before the end of the subframe/slot). However, such techniques may be used for any system in which TTIs of different lengths may be transmitted in a wireless communications system.

The described techniques provided in various examples provide for identifying an uplink TTI length for uplink transmissions, and a downlink TTI length for downlink transmissions, in which the uplink TTI length and the downlink TTI length may be different and one or both of the uplink and downlink TTIs may be sTTIs. For example, the downlink TTI length may be sTTI length, and the uplink TTI length may be longer than the downlink sTTI length (e.g., a longer sTTI or a 1 ms TTI). Various parameters for transmissions between a user equipment (UE) and a base station may be determined based on one or more of the uplink TTI length or the downlink TTI length. For example, one or more of a feedback process (e.g., a HARQ process) transmission timing, a timing advance (TA) value, a transport block size (TBS), a number of spatial layers, a number of component carriers (CCs), or a channel quality information (CQI) reporting type for uplink and/or downlink transmissions may be determined based on one or more of the uplink TTI length or the downlink TTI length.

In some examples, a downlink HARQ timing may be based on the downlink TTI length, and a timing between receipt of HARQ feedback and responsive transmissions or retransmissions of data may be based on the uplink TTI length. In other examples, the downlink HARQ timing may be based on the downlink TTI length, and the timing between receipt of HARQ feedback and responsive transmissions or retransmissions of data may also be based on the downlink TTI length. In some cases, a timing for transmission of HARQ feedback or timing of the responsive transmissions or retransmissions may be shifted to provide that the transmission aligns with a TTI or sTTI boundary. In some cases, the downlink sTTI length may be shorter than the uplink sTTI or TTI length, and HARQ feedback information may be grouped and transmitted according to the downlink HARQ timing.

In some examples, a TA value may be determined based on the downlink TTI length, and a maximum TA value may be identified. Other parameters, such as a TBS, number of spatial layers, number of CCs, or CQI reporting type may be identified based at least in part on the TA value or maximum TA value. In some cases, an uplink control channel transmission may include HARQ feedback for two or more downlink sTTIs, and coding (e.g., Reed-Muller coding or Turbo coding) may be used to code HARQ feedback. In some cases, the TA value may be determined based on the uplink sTTI or TTI length, and processing timing (e.g., HARQ feedback transmission timing) may be based on the uplink sTTI or TTI length.

Aspects of the disclosure are initially described in the context of a wireless communications system. Various asymmetric TTI lengths with associated timings and transmissions are then described. Aspects of the disclosure are further illustrated by and described with reference to apparatus diagrams, system diagrams, and flowcharts that relate to asymmetric downlink-uplink transmission time interval configurations for low latency operation.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-Advanced (LTE-A) network, or an NR network. In some cases, wireless communications system 100 may support enhanced broadband communications, ultra-reliable (e.g., mission critical) communications, low latency communications, and communications with low-cost and low-complexity devices. Wireless communications system 100 may provide for wireless transmissions in which uplink TTIs and downlink TTIs may be asymmetric, with various transmissions and timings based on one or both of the uplink or downlink TTI length.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, an MTC device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as a base station 105 may include subcomponents such as an access network entity, which may be an example of an access node controller (ANC). Each access network entity may communicate with a number of UEs 115 through one or more access network transmission entities, each of which may be an example of a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases, a wireless local area network (WLAN) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

In some cases, wireless communications system 100 may be a packet-based network that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and a network device such as a base station 105 or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period, which may be referred to as a modulation and coding scheme (MCS)). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

As indicated above, in some cases, base stations 105 and UEs 115 may use a HARQ process to provide feedback (e.g., acknowledgment/negative-acknowledgment (ACK/NACK) feedback) of successful receipt of transmissions and to provide retransmissions in the event that a transmission is not successfully received. Timings for generating and transmitting HARQ feedback and for generating and retransmitting unsuccessfully received transmissions may be based on pre-established rules for such timing between a reception TTI and a subsequent transmission. For example, an n+4 rule may be established in which the subsequent transmission is to be made four TTIs, or a first available TTI thereafter, following the reception TTI. In such cases, if a reception TTI is TTI-0, the subsequent transmission would be made at TTI-4. In cases, where asymmetric TTI lengths are used for uplink and downlink transmissions, various aspects of the present disclosure provide for techniques for determining timing and/or other parameters to account for the different TTI lengths for uplink and downlink transmissions. Such timing techniques may also be used for other timings as well, such as for timing between reception of downlink control information (DCI) and an associated uplink transmission, for example.

Further, when transmitting uplink transmissions, a UE 115 may use a TA value that may compensate for propagation delay between when the UE 115 starts a transmission and when a base station 105 receives the transmission. The TA value is a negative offset, at the UE 115, between the start of a received downlink TTI and a transmitted uplink TTI. This offset at the UE 115 may help to ensure that the downlink and uplink TTI transmissions are synchronized at the base station 105. A UE 115 that is located relatively far from a serving base station 105 may encounter a larger propagation delay, so its uplink transmission is started earlier than another UE 115 that is closer to the same serving base station 105. In some examples, maximum TA threshold values may be set to provide a UE 115 with sufficient processing time prior to the start of an uplink transmission. In some cases, a TA value and maximum TA threshold value may be determined based in a TTI length of uplink or downlink transmissions, and one or more other parameters, such as a TBS, number of spatial layers, number of CCs, or CQI reporting type may be identified based at least in part on the TA value.

Figure 2:
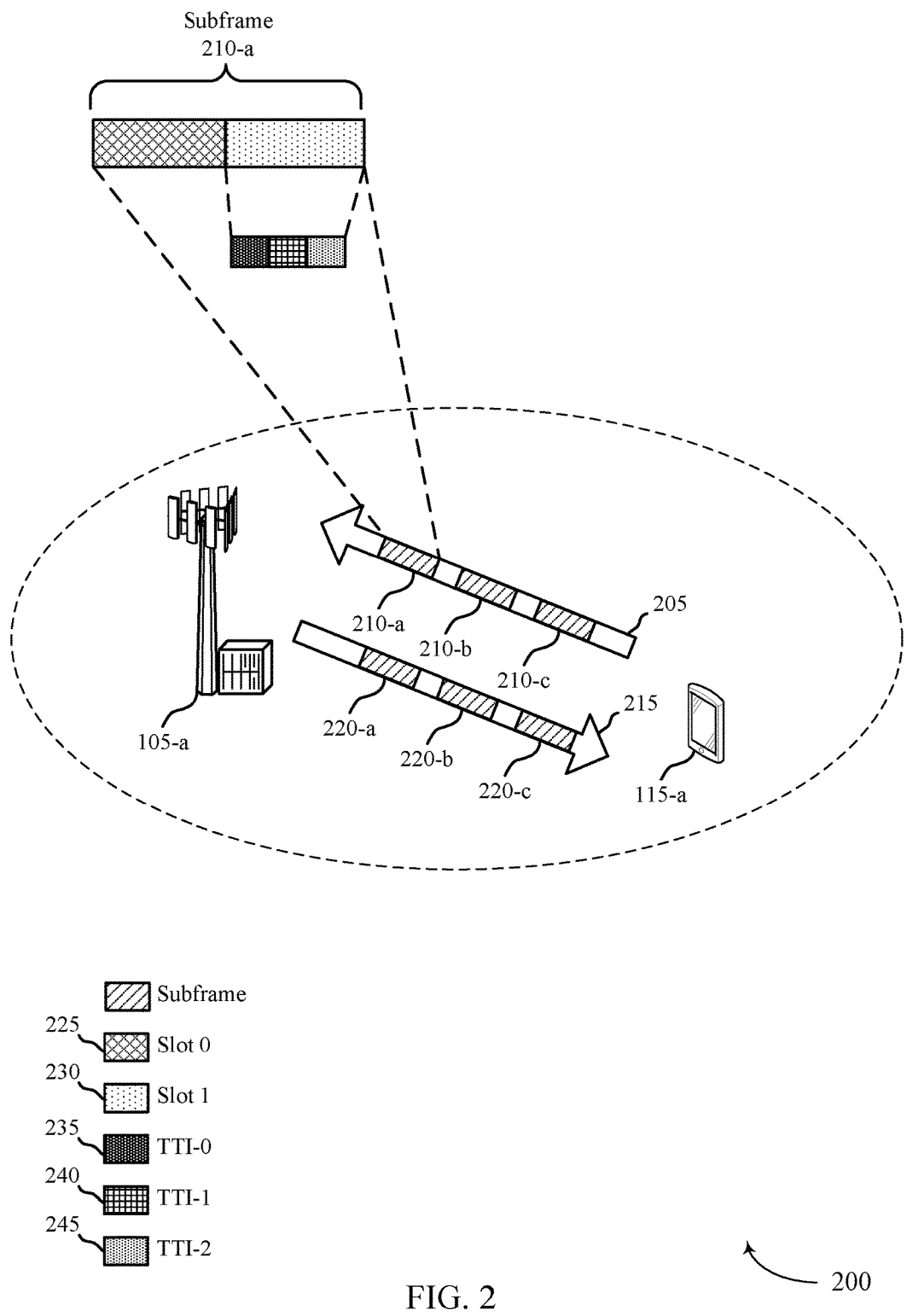
FIG. 2 illustrates an example of a system for wireless communication that supports asymmetric downlink-uplink TTI configurations for low latency operation in accordance with aspects of the present disclosure.

FIG. 2 illustrates an example of a wireless communications system 200 for asymmetric downlink-uplink TTI configurations for low latency operation in accordance with various aspects of the present disclosure. Wireless communications system 200 includes base station 105-a and UE 115-a, which may be examples of aspects of a UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with UE 115-a over an uplink carrier 205 and a downlink carrier 215. In some examples, base station 105-a may allocate resources for communication with UEs 115 over uplink carrier 205 and downlink carrier 215. For example, base station 105-a may allocate uplink subframes 210 in uplink carrier 205 for uplink transmissions from UE 115-a, and one or more uplink subframes 210 may correspond to a legacy LTE TTI of 1 ms. In this example, uplink subframes 210 may include a first uplink subframe 210-a, a second uplink subframe 210-b, and a third uplink subframe 210-c. Each of the uplink subframes 210 may include two slots, in which each slot may have seven OFDM symbols for a normal cyclic prefix. In this example, a first slot (slot 0) 225 and a second slot (slot 1) 230 may be included in the first uplink subframe 210-a.

As indicated above, in the uplink of a low latency system, different sTTI lengths may be used for transmissions over uplink carrier 205. For example, two-symbol sTTI and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 225 or second slot 230, there may be multiple sTTIs, such as a first sTTI (TTI-0) 235, a second sTTI (TTI-1) 240, and a third sTTI (TTI-2) 245, that may each have a two or three OFDM symbol duration. Such TTI durations may also apply to downlink subframes 220 transmitted on downlink carrier 215. In some examples, different length TTIs may be used on the uplink carrier 205 and the downlink carrier 215, resulting in asymmetric TTI lengths for uplink and downlink transmissions.

When a two-symbol sTTI is used, in some cases it may be desirable to have a fixed sTTI structure in which sTTI boundaries lie within slot boundaries or are aligned with slot boundaries, such as the boundaries of the first slot 225 or second slot 230, which may be referred to as slot-aligned sTTIs. As discussed above, when using a normal cyclic prefix, seven symbols are included in each of first slot and second slot 230, and thus each slot may include three sTTIs for slot-aligned sTTIs. In some cases, one of the sTTIs may be configured as a three-symbol TTI, so as to efficiently utilize each symbol of each slot. In such cases, different patterns can be considered, such as having the three-symbol TTI located at the end of first slot 225 or second slot 230, or at the beginning of first slot 225 or second slot 230. When using two-symbol sTTIs or a combination of two-symbol and three-symbol sTTIs, such sTTIs may be referred to as 2-symbol sTTIs. When using sTTIs having a duration corresponding to one slot, such sTTIs may be referred to as slot sTTIs. When using TTIs having a duration correspond to a subframe, such TTIs may be referred to as 1 ms TTIs or legacy TTIs.

In some cases, although UE 115-a may be served using a 2-symbol sTTI in downlink transmissions, a 2-symbol uplink transmission (such as PUCCH or sPUCCH) may not provide sufficient uplink coverage to provide reliable reception of the uplink transmissions. In such cases, a longer sTTI (e.g., a slot sPUCCH) or a 1 ms PUCCH, may be employed for uplink transmissions. The possibility of increasing the uplink coverage comes at the cost of increasing the HARQ round trip time (RTT) due to the asymmetry in the downlink and uplink TTI lengths. In such cases, the UE 115-a may be scheduled for a 2-symbol sTTI in a downlink transmission and may be configured to use either a 1-slot sPUCCH or a 1 ms PUCCH depending on its channel condition. In either case, the associated sPUCCH or PUCCH transmission may provide uplink information for multiple 2-symbol downlink sTTIs. In some examples, 2-symbol downlink sTTIs may use a first pattern of symbols {3,2,2,2,2,3} for the two slots within a subframe boundary, or may use a second pattern of symbols {2,3,2,2,2,3} for such transmissions. In some cases, the pattern to be used may be indicated in a physical control format indicator channel (PCFICH), in which a PCFICH value of 1 or 3 indicated the first pattern, and a PCFICH value of 2 indicates the second pattern. One of the following two patterns will also be specified for the uplink transmissions for 2-symbol sTTI transmissions: {3,2,2,2,2,3} or {2,2,3,2,2,3}. As indicated above, in some cases asymmetric uplink and downlink TTIs may be used, and this the timing for various transmissions may be determined based on one or more of the uplink TTI or downlink TTI.

Figure 3:
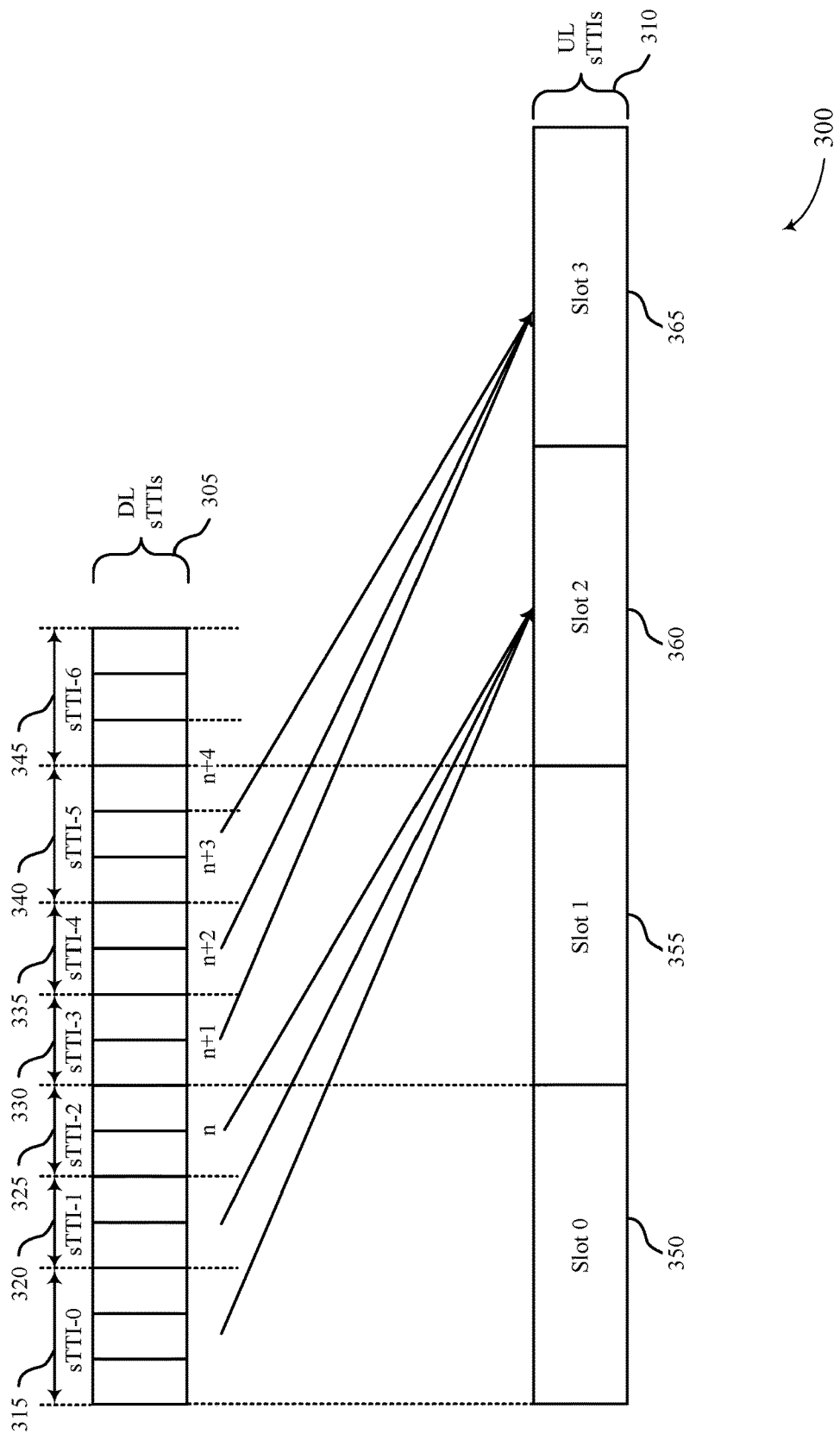
FIG. 3 illustrates an example of asymmetric uplink and downlink TTIs and associated timings for low latency operation in accordance with aspects of the present disclosure.

FIG. 3 illustrates an example of asymmetric uplink and downlink TTIs 300 and associated timings for low latency operation, in accordance with various aspects of the disclosure. Asymmetric uplink and downlink TTIs 300 may be used for communications between a UE and a base station such as discussed above with respect to FIGS. 1 and 2. In this example, downlink sTTIs 305 may be used for downlink transmissions from a base station to a UE, and be transmitted using the pattern {3,2,2,2,2,3} as discussed above. In this example, sTTI-0 315 may be a three-symbol sTTI, sTTI-1 320 through sTTI-4 335 may be two-symbol sTTIs, and sTTI-5 340 and sTTI-6 345 may be three-symbol sTTIs in accordance with the downlink pattern.

Also in this example, uplink sTTIs 310 may be used for uplink transmissions from the UE to the base station, and may have a longer TTI duration than downlink sTTIs 305. In this example, each of the uplink sTTIs 310 may be slot sTTIs, having a length that corresponds to a slot of a subframe. As discussed above, assuming a normal cyclic prefix, each slot sTTI 350 through 365 may have a duration that corresponds to seven OFDM symbols, and downlink sTTIs 305 and uplink sTTIs 310 may be slot-aligned. Such a configuration of asymmetric uplink and downlink TTIs may be referred to as a {2,7} configuration, with a 2-symbol sTTI for downlink transmissions and a slot sTTI (7 symbols) for uplink transmissions. Other configurations may be referred to using such a nomenclature, with {2,2} referring to 2-symbol sTTIs for both uplink and downlink, {2,14} referring to 2-symbol downlink and 1 ms uplink TTIs, and {7,14} referring to slot sTTI downlink and 1 ms uplink TTIs.

As discussed above, for HARQ ACK/NACK feedback, the ACK/NACK transmission may be transmitted during a TTI that with the relationship n+4 following the TTI in which a transmission is received. That is, for a downlink reception in TTI n, ACK/NACK feedback is to be transmitted at or after TTI n+4. However, when using asymmetric uplink and downlink TTIs, in which the uplink TTIs 310 are longer than the downlink sTTIs 305 such as in FIG. 3, ACK/NACK feedback information from multiple downlink sTTIs 305 may be reported in one uplink sTTI 310. In this example, the TTI length associated with downlink sTTIs 305 may be used to determine an uplink sTTI 310 that is to be used for transmitting ACK/NACK feedback, and ACK/NACK feedback for each downlink sTTI 305 in a slot may be reported in an uplink sTTI 310. Given the n+4 timing of this example, the sTTI associated with the last downlink transmission is used as TTI n, which corresponds to sTTI-2 325 in this example. Using a 2-symbol sTTI as the sTTI length, the value of n+4 would result in a start time for the subsequent ACK/NACK transmission beginning at the last symbol of slot1 355, and with the sTTI associated with n+4 spanning to the first symbol of slot2 360. In such cases, the start time of the subsequent transmission may be shifted to start at the beginning of slot2 360, and the ACK/NACK feedback for sTTI-0 315 through sTTI-2 may be reported in sPUCCH transmissions that are transmitted in the uplink sTTI corresponding to slot2 360. Similarly, the ACK/NACK feedback for downlink sTTIs 305 corresponding to slot1 355 may be transmitted in slot3 365.

In some examples, a UE may group ACK/NACK feedback across subframe boundaries and transmit the grouped feedback information according to a transmission timing associated with the sTTIs in the earlier subframe. For example, sTTIs within slot-2 360 (of subframe N) may be grouped with sTTIs within slot-1 355 (of subframe N−1) and HARQ ACK/NACK feedback may be transmitted to the base station in slot 0 (subframe N+1). Such grouping in this configuration provides a sufficient symbol gap for processing both at the UE and at the base station. Based on the n+4 timing rule when n is the 2-symbol sTTI duration, this gap may be sufficient. In another example, for n+6 timeline (e.g., k=6), the HARQ ACK/NAK of sTTI-4 and sTTI-5 of subframe N−1 and sTTI-0 of subframe N will be mapped to uplink slot 0 of subframe N+1.

Techniques may also be applicable and utilized for processing between an uplink grant (e.g., received via a downlink sTTI 305) and a uplink transmission (e.g., for transmission via an sPUSCH in an uplink sTTI 310). For example, an uplink grant for slot 0 in subframe 4 may be sent in sTTI-4 of subframe 1, sTTI-5 of subframe 1, or sTTI-0 of subframe 2. An uplink grant for slot 1 in subframe 4 may be transmitted in sTTI-1, sTTI-2, or sTTI-3 of subframe 2. In such cases, this may allow sufficient time for processing the uplink grant received in a downlink sTTI 305 before transmitting in an uplink sTTI 310.

Figure 4:
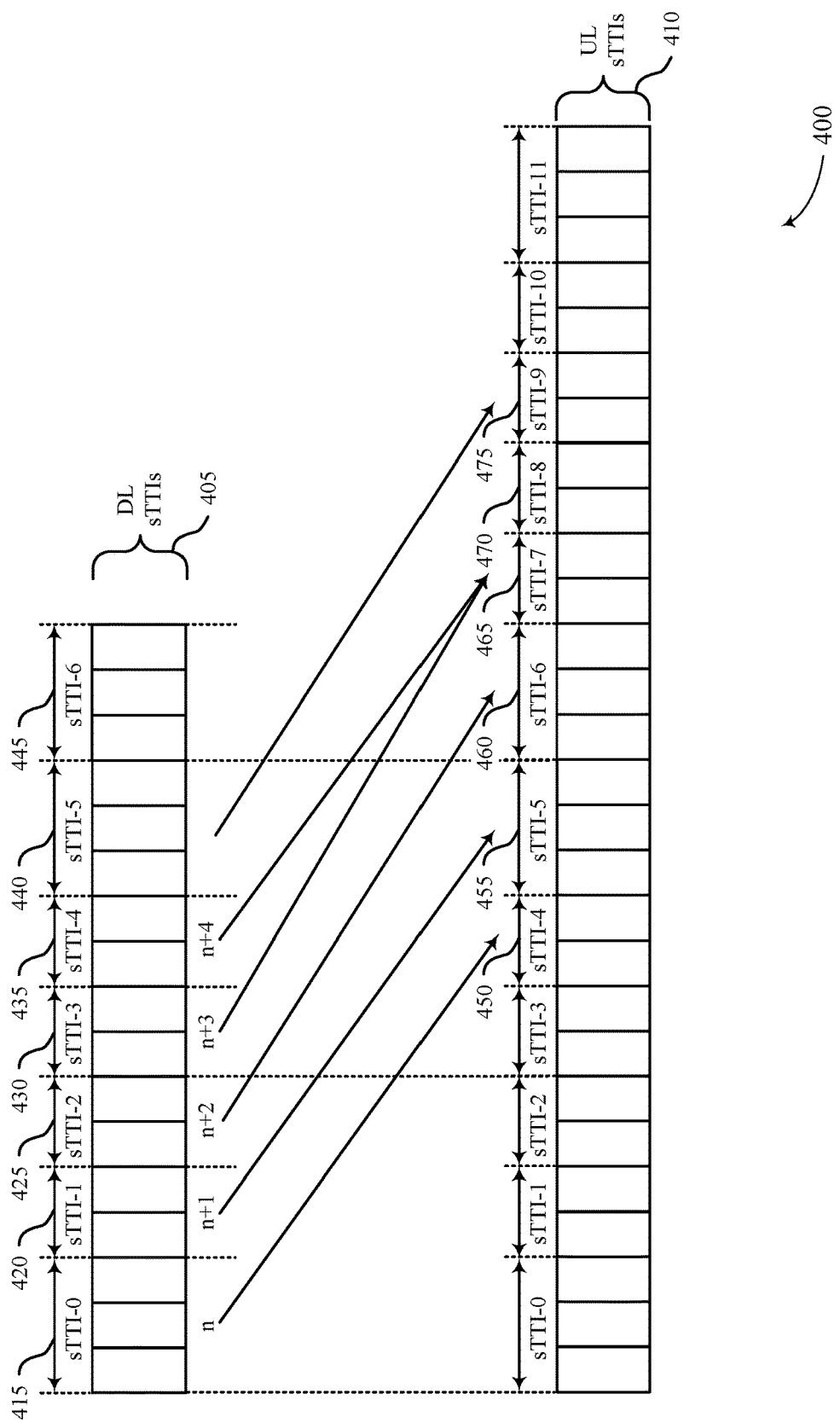
FIG. 4 illustrates an example of symmetric uplink and downlink TTIs and associated timings for low latency operation in accordance with aspects of the present disclosure.

FIG. 4 illustrates an example of symmetric uplink and downlink TTIs 400 with grouping for low latency operation in accordance with various aspects of the present disclosure. Symmetric uplink and downlink TTIs 400 may be used for communications between a UE and a base station such as discussed above with respect to FIGS. 1 and 2. In this example, downlink sTTIs 405 may be used for downlink transmissions from a base station to a UE, and be transmitted using the pattern {3,2,2,2,2,3} as discussed above. Uplink sTTIs 410 may be used for uplink transmissions from a UE to a base station, and be transmitted using the pattern {3,2,2,2,2,3} as discussed above. In this example, downlink sTTIs 405 may include a three-symbol sTTI-0 415, sTTI-1 420 through sTTI-4 435 may be two-symbol sTTIs, and sTTI-5 440 and sTTI-6 445 may be three-symbol sTTIs in accordance with the downlink pattern. The uplink sTTIs 410 may have a same {3,2,2,2,2,3} pattern, although the techniques as described herein are applicable in cases where the uplink sTTIs 410 have a different pattern than the downlink sTTIs 405.

Such a configuration of uplink and downlink TTIs may be referred to as a {2,2} configuration, with a 2-symbol sTTI for downlink and uplink transmissions. As discussed above, for HARQ ACK/NACK feedback, the ACK/NACK transmission may be transmitted during a TTI that with the relationship n+4 following the TTI in which a transmission is received. In this case, for a downlink reception in TTI n, which corresponds to sTTI-0 415 in this example, ACK/NACK feedback is to be transmitted at or after TTI n+4, which corresponds to uplink sTTI-4 450. ACK/NACK feedback for downlink sTTI-1 420 may be transmitted in uplink sTTI-5 455, and ACK/NACK feedback for downlink sTTI-2 425 may be transmitted in uplink sTTI-6 460. However, as the uplink sTTI-6 460 is a three-symbol sTTI, the subsequent ACK/NACK transmission for downlink sTTI-3 430 would start in the last symbol of uplink sTTI-6 460, and thus the transmission of the ACK/NACK transmission for downlink sTTI-3 430 may be time shifted to align with uplink sTTI-7 465. Similarly, because of the two consecutive uplink three-symbol sTTIs sTTI-5 455 and sTTI-6 460, the ACK/NACK transmission for downlink sTTI-4 435 may align with uplink sTTI-7 465. Finally, in this example, ACK/NACK feedback for downlink sTTI-5 440 may be transmitted in uplink sTTI-9 475, with uplink sTTI-8 470 not carrying any HARQ ACK/NACK feedback information. In some cases, when ACK/NACK feedback for multiple downlink sTTIs 405 are included in a single uplink sTTI 410, the combined ACK/NACK feedback may be coded, such as according to a Turbo coding scheme or a RM coding scheme, for example.

Thus, overall HARQ feedback timing may be reduced when using shorter uplink sTTIs. For example, under the n+4 timing rule, the average downlink HARQ delay is 6.66 symbols if a {2,2} configuration is assumed, and 9.33 symbols if a {2,7} configuration is assumed. Thus, the price of using a longer sTTI length in the uplink is increasing the downlink HARQ timing by about 190 microseconds (μs), and thus increasing the overall RTT and latency relative to the {2,2} configuration. As indicated above, in some cases an increased uplink TTI length may be selected based on channel conditions. As channel conditions worsen, the likelihood for HARQ retransmissions increases, which may also impact latency in the system. Thus, in some examples, the TTI length for uplink transmissions may be selected based at least in part on channel conditions, in which a longer uplink TTI may be selected when the associated increase in HARQ timing provides an overall benefit when taking into account an expected rate of retransmissions for relatively poor channel conditions. In some cases, a base station may receive CQI information from a UE and may configure the UE for particular TTI durations based at least in part on the CQI.

Figure 5:
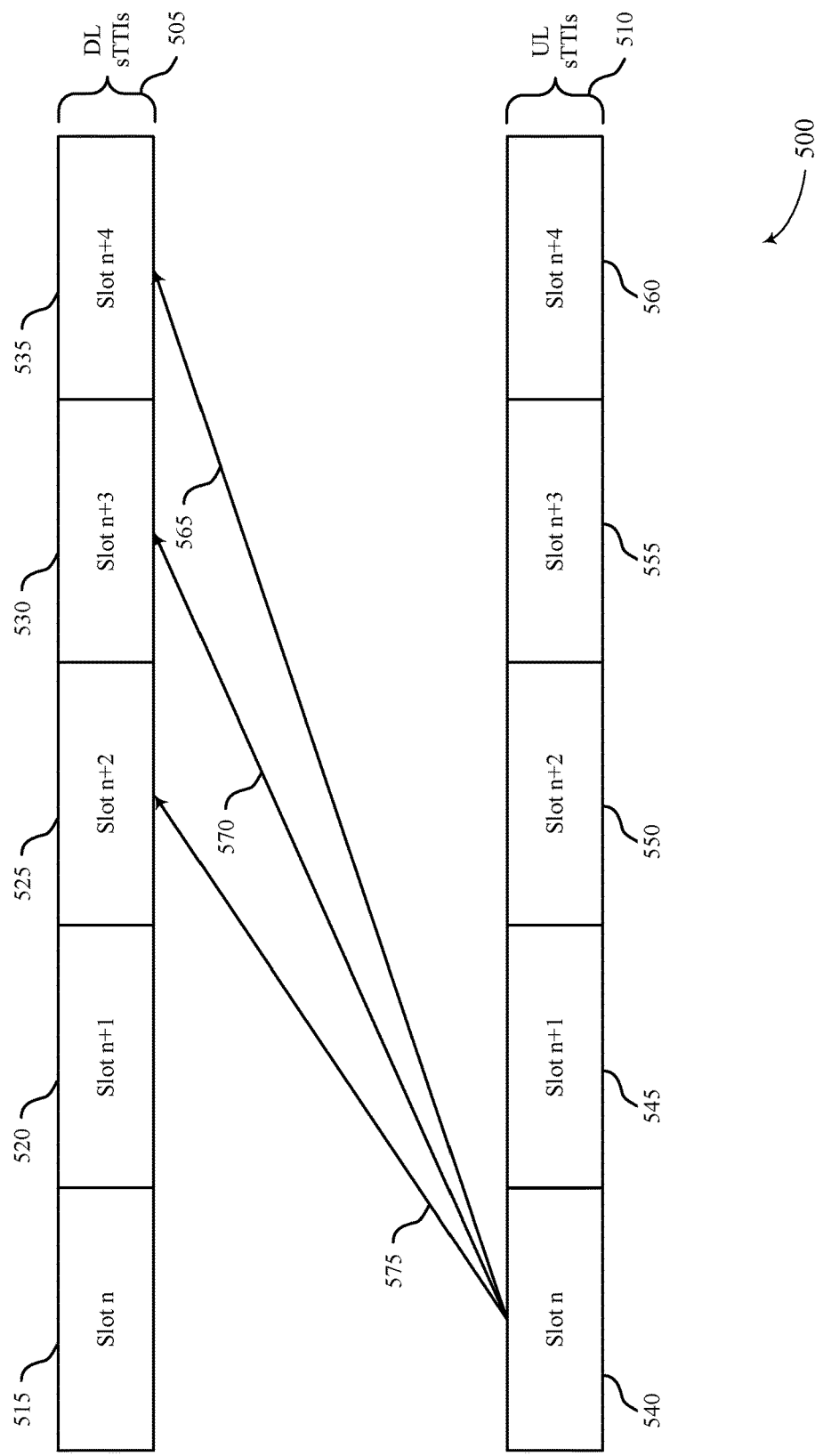
FIG. 5 illustrates an example of feedback reception to transmission or retransmission timing for asymmetric uplink and downlink TTIs in accordance with aspects of the present disclosure.

FIG. 5 illustrates an example of feedback reception to transmission or retransmission timing 500 for asymmetric downlink-uplink TTI configurations for low latency operation in accordance with various aspects of the present disclosure. Uplink and downlink transmission time intervals 500 may be used for communications between a UE and a base station such as discussed above with respect to FIGS. 1 and 2. In this example, downlink sTTIs 505 may be used for downlink transmissions for a UE to a base station, and may include 1 ms TTIs, 2-symbol sTTIs or slot sTTIs. In this example, downlink slot n 515 through downlink slot n+4 are illustrated, along with uplink slot n 540 through uplink slot n+4 560. In this example, uplink sTTIs 510 may be slot sTTIs, and HARQ ACK/NACK feedback may be received by a base station from a UE during uplink slot n 565.

The base station may process the AKC/NACK feedback and determine if a previous transmission is to be retransmitted, or if a new transmission may be transmitted, responsive to the ACK/NACK feedback. If the downlink sTTIs 505 have a length of a slot sTTI or 1 ms TTI, then the ACK/NAK to transmission/retransmission timing could be based on the n+4 rule, as indicated at arrow 565 is this example. In other cases, the downlink sTTIs 505 may be 2-symbol sTTIs, and the base station may prepare a new transmission or a retransmission more quickly than is the downlink sTTIs 505 were longer. This is due to the TBS being inversely proportional to the TTI length, although certain processing operations may not be performed faster at the base station for shorter TTIs, such as, channel estimation and sPUCCH decoding, for example. Thus, the ACK/NAK to transmission/retransmission timing may be computed as a function of the uplink sTTI length, but under shortened processing time, e.g., n+3 or n+2 as shown in the figure at arrow 570 and arrow 575, respectively.

In various examples, the processing timing at the base station may be based on the downlink TTI length or the uplink TTI length. In examples where the processing timing is based on the uplink TTI length (e.g., 1 slot or 1 ms), the timing could be n+2, n+3 or n+4, where n is the duration of the uplink TTI. If the downlink sTTI length is 2 symbols, then the timing choice may be n+2 where n is the duration of the uplink TTI. In such examples, in a {2,7} configuration, if the base station processing is based on n+2 and slot duration, there will be 7 symbol gap between the ACK/NACK feedback reception and transmission/retransmission. In a {2,14} configuration, if the base station processing is based on n+2 and 1 ms duration, there will be a 14 symbol gap between the ACK/NACK feedback reception and transmission/retransmission.

In other examples, processing timing at the base station may be based on the downlink TTI length, and n+k timing may be used (e.g., where k≥4 and n is the 2-symbol sTTI length), and thus the processing timing is based on the downlink sTTI length. In some cases, the transmission/retransmission is not necessarily aligned with either the slot or subframe boundaries, and may be initiated based on the n+k timing. As an example, if the 7-symbol or the 14-symbol gap discussed above are not sufficient, or if more flexibility is desired in terms of the retransmission timings, this option may be selected.

Figure 6:
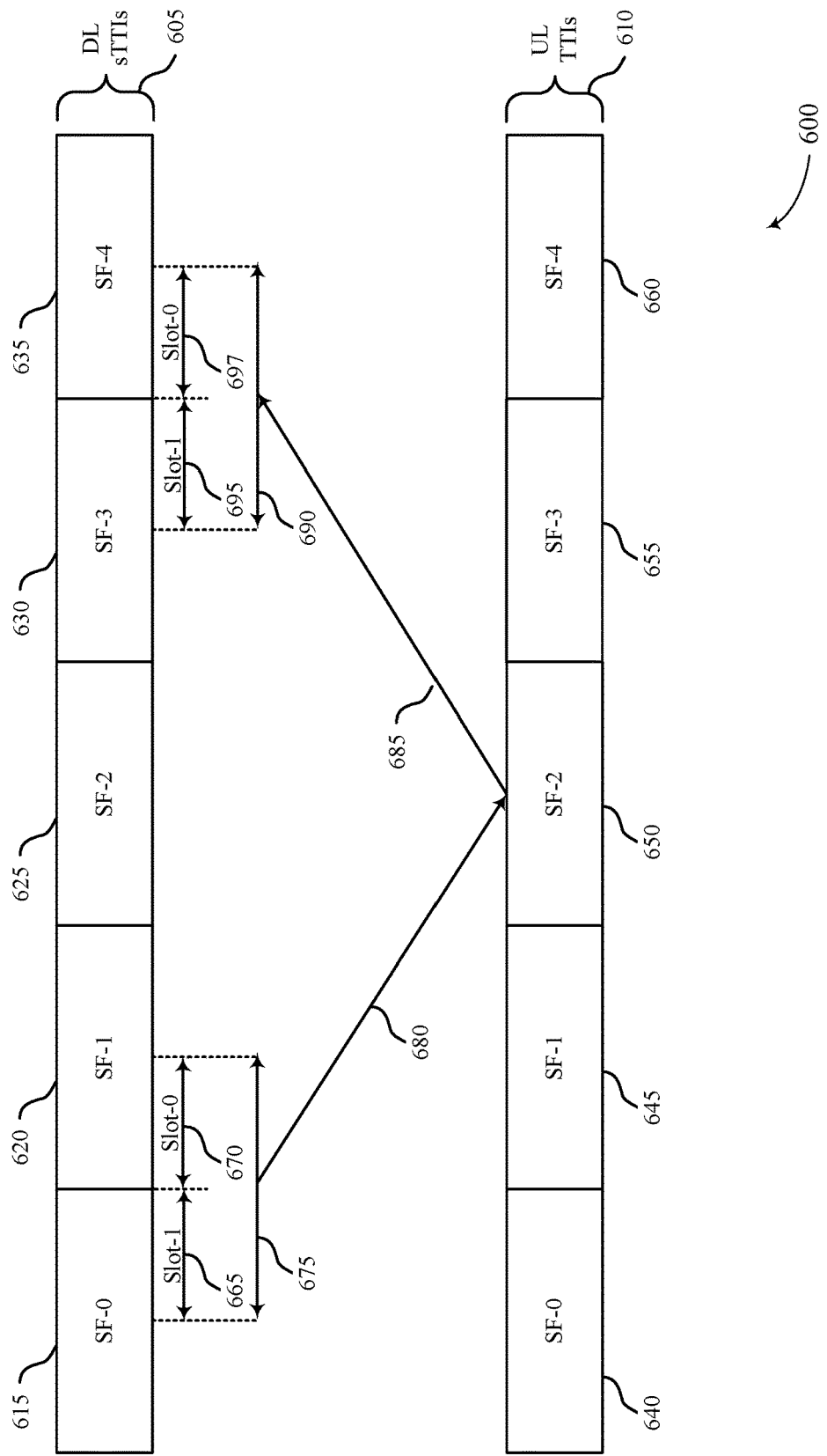
FIG. 6 illustrates an example of feedback bundling across subframe boundaries that supports asymmetric downlink-uplink TTI configurations for low latency operation in accordance with aspects of the present disclosure.

FIG. 6 illustrates an example of feedback bundling across subframe boundaries 600 for asymmetric downlink-uplink TTI configurations for low latency operation in accordance with various aspects of the present disclosure. Feedback bundling across subframe boundaries 600 may be used for communications between a UE and a base station such as discussed above with respect to FIGS. 1 and 2. In this example, downlink sTTIs 605 may be slot-aligned sTTIs used for downlink transmissions for a UE to a base station, and may include 2-symbol sTTIs. In this example, downlink subframe boundaries are illustrated for downlink subframe-0 615 through downlink subframe-4 635, along with uplink subframe-0 640 through uplink subframe-4 660. In this example, uplink TTIs 610 may be 1 ms TTIs.

In this example, a UE may group ACK/NACK feedback across subframe boundaries and transmit the grouped feedback information according to a transmission timing associated with the sTTIs in the earlier subframe. For example, sTTIs within slot-1 665 of subframe-0 615 may be grouped with sTTIs within slot-0 670 of subframe-1 620 to generate feedback for a time period 675 that spans a subframe boundary, and HARQ ACK/NACK feedback 680 may be transmitted to the base station in uplink subframe-2 650. Such grouping in this configuration provides a 7-symbol gap for processing both at the UE and at the base station. Based on the n+4 timing rule when n is the 2-symbol sTTI duration, this gap may be sufficient.

The base station may process the ACK/NACK feedback and determine if a previous transmission is to be retransmitted, or if a new transmission may be transmitted, responsive to the ACK/NACK feedback. The new transmissions and/or retransmissions 685 may be transmitted in time period 690 that spans slot-1 695 of subframe-3 630 and in slot-0 697 of subframe-4 635.

Figure 7:
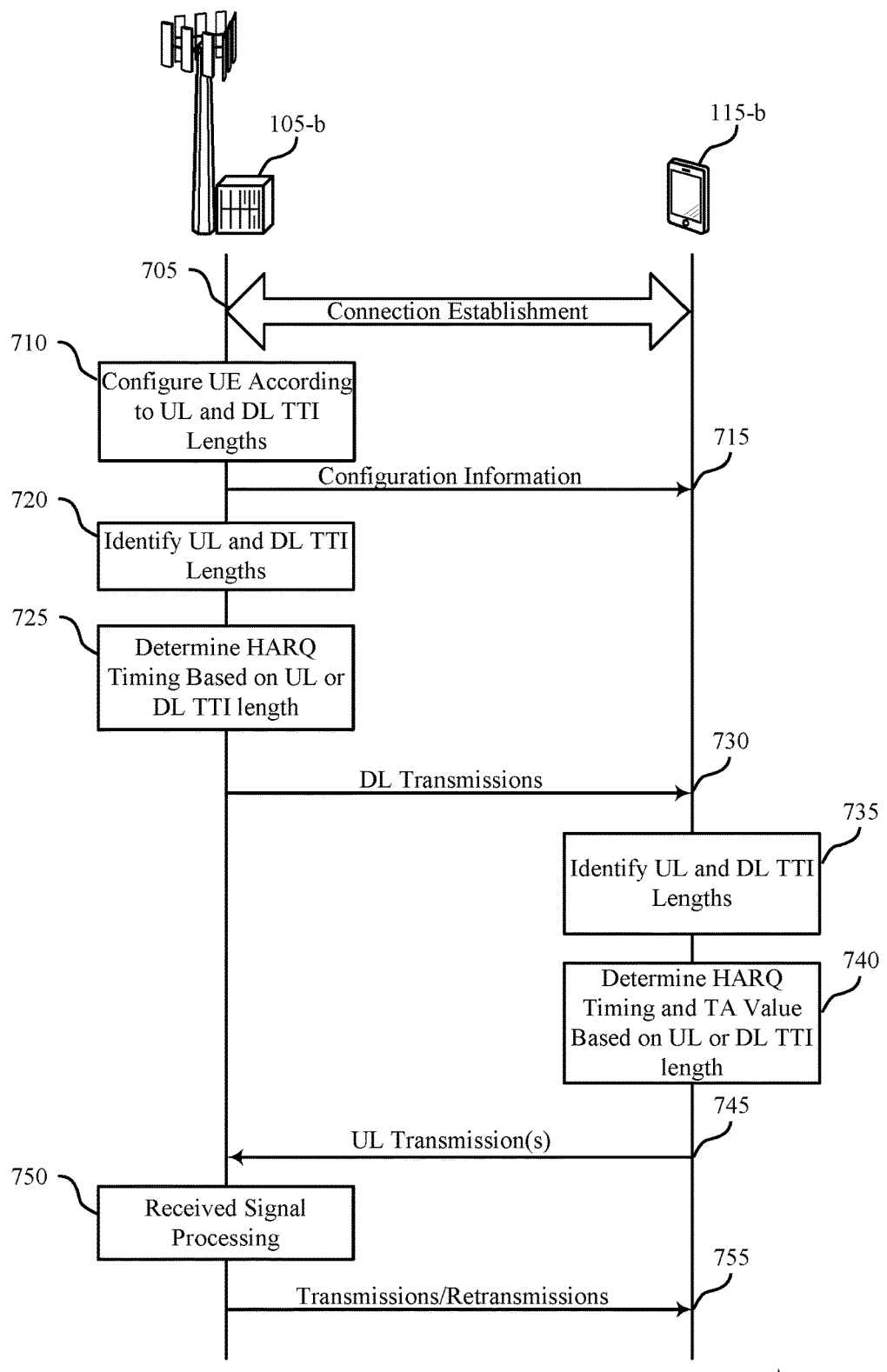
FIG. 7 illustrates an example of a process flow that supports asymmetric downlink-uplink TTI configurations for low latency operation in accordance with aspects of the present disclosure.

FIG. 7 illustrates an example of a process flow 700 for asymmetric downlink-uplink TTI configurations for low latency operation in accordance with various aspects of the present disclosure. Process flow 700 may include a base station 105-b, and a UE 115-b, which may be examples of the corresponding devices described with reference to FIG. 1-2. The base station 105-b and the UE 115-b may establish a connection 705 according to connection establishment techniques for the wireless communications system.

At block 710, base station 105-b may configure the UE 115-b according to uplink and downlink TTI lengths. For example, the base station 105-b may determine that the UE 115-b may operate using low latency communications and may configure the UE 115-b to use sTTIs when low-latency data (e.g., URLLC data or MiCr data) is to be transmitted. In some cases, the base station 105-b may identify uplink channel conditions that may support certain TTI lengths and configure the UE 115-b for sTTI transmissions based on the channel conditions at the UE 115-b. The base station 105-b may transmit the configuration information 715 to the UE 115-b.

At block 720, the base station 105-b may identify uplink and downlink TTI lengths for one or more transmissions. The base station 105-b may, for example, identify that the UE 115-b is capable of low-latency communications using sTTIs and that the UE 115-b has been configured for sTTI transmissions. The base station 105-b may identify that low-latency data is present for transmission, such as based on a buffer status report (BSR) provided by the UE 115-b or buffered data to be transmitted to the UE 115-b, for example.

In some cases, the base station 105-*b* may determine that channel conditions at the UE 115-*b* may indicate that a longer uplink TTI length may improve coverage for the UE 115-*b*, and identify a longer uplink TTI length than the downlink TTI length.

At block 725, the base station 105-*b* may determine HARQ timing based on the uplink or downlink TTI length. For example, HARQ timing may be based on the downlink TTI length when the downlink TTI length is shorter than the uplink TTI length, as discussed above. In some examples, the base station 105-*b* may determine a timing for a HARQ retransmission or a new transmission following receipt of feedback information from the UE 115-*b*, which may be based on the downlink TTI length or the uplink TTI length, as discussed above. The base station 105-*b* may transmit downlink transmissions 730 using downlink TTIs having the determined downlink TTI length.

At block 735, the UE 115-*b* may identify the uplink and downlink TTI lengths. The UE 115-*b* may make such an identification based on configuration information from the base station 105-*b*, a service associated with data to be transmitted, channel conditions at the UE, or PCFICH information, for example. In some cases, the UE 115-*b* may identify that the uplink TTI length is different than the downlink TTI length, as discussed above.

At block 740, the UE 115-*b* may determine HARQ timing and a TA value based on the uplink TTI length, the downlink TTI length, or combinations thereof. In some cases, the downlink TTI length may be shorter than the uplink TTI length, and HARQ timing and the TA value may be determined based in the downlink TTI length, as discussed above. In some cases, a maximum TA value may also be determined based on the uplink TTI length and/or the downlink TTI length.

In some examples, the downlink HARQ timing man be based on n+$k_1$, where, for example n may be the downlink sTTI index and $k_1$ may be counted in terms of the number of downlink TTIs (e.g., $k_1 \geq 4$). In some cases, a certain time shift may be applied so that the uplink transmission is aligned with uplink TTI boundaries. In some examples, the ACK/NAK feedback transmission to HARQ retransmission or new transmission timing can be based on n+$k_2$, where n is the uplink TTI index and $k_2$ may be smaller than $k_1$ (e.g., $k_2$=2 or 3 (for shortened processing timing) or 4). In other examples, the downlink HARQ timing can be based on n+$k_1$, where n is the downlink sTTI index and $k_1$ may be counted in terms of the number of downlink TTIs (e.g., $k_1 \geq 4$). A certain time shift may be applied as needed so that the uplink transmission is aligned with the uplink TTI boundaries.

In some examples, the ACK/NAK to transmission/retransmission timing may be based on n+$k_2$, where n is the downlink TTI index and $k_2$ may be counted in terms of the number of downlink TTIs (e.g., $k_2 \geq 4$). Again, a certain time shift may be applied so that the downlink transmission is aligned with the downlink sTTI boundaries. In some cases, $k_1$ and $k_2$ may be identical, or may not be identical. Additionally, for the {2,14} configuration, sTTIs of a second slot of a subframe n and the first slot of a subsequent subframe n+1 can be grouped, and the processing timing at both the UE 115-*b* and the base station 105-*b* may be based on the n+k rule.

As indicated above, in some cases, a TA value and processing timing may be determined based on one or more of the uplink TTI length or the downlink TTI length. In some cases, a maximum TA value may be set based on the downlink sTTI length or the uplink TTI length. In some examples, even if PUCCH uses a longer TTI length (e.g., in the case of {2,7} or {2,14} configuration), the maximum TA may be based on the downlink sTTI length. In some examples, one or more other parameters may be dependent on the maximum TA value, such as TBS, number of spatial layers, number of CCs, or CQI reporting, for example, may also be devised based on the downlink sTTI length. In some cases, a relatively longer PUCCH requires more time for transmission preparation. Additionally, a slot sPUCCH or 1 ms PUCCH may need to provide ACK/NACK information for multiple downlink sTTIs, and may have to handle multiple ACK/NAK bits. In some examples, RM coding or Turbo coding may be used for sPUCCH transmissions, such as based on PUCCH format 3. Such a longer uplink TTI length may be chosen if the UE 115-*b* has relatively poor coverage. In cases where longer uplink TTI length is selected, the TA value may be set based on the longer uplink sTTI/TTI length. In addition, the processing timing can also be based on this TA value. For example, for a {2,2} configuration, an n+4 timing may be used with TA1, while for {2,7} configuration, a n+6 or n+7 timing may be used with TA2, where TA2>TA1.

The UE 115-*b* may transmit uplink transmissions 745 to the base station 105-*b* based on the uplink TTI length. The uplink transmissions 745 may include feedback information based on the timing from the downlink transmissions 730. At block 750, the base station may perform received signal processing. For example, the base station 105-*b* may process ACK/NACK feedback information and determine whether a retransmission of certain data is needed, and format a new transmission or the retransmission 755 for downlink transmission in a subsequent downlink TTI based on the timing between feedback reception and transmission or retransmission.

Figure 8:
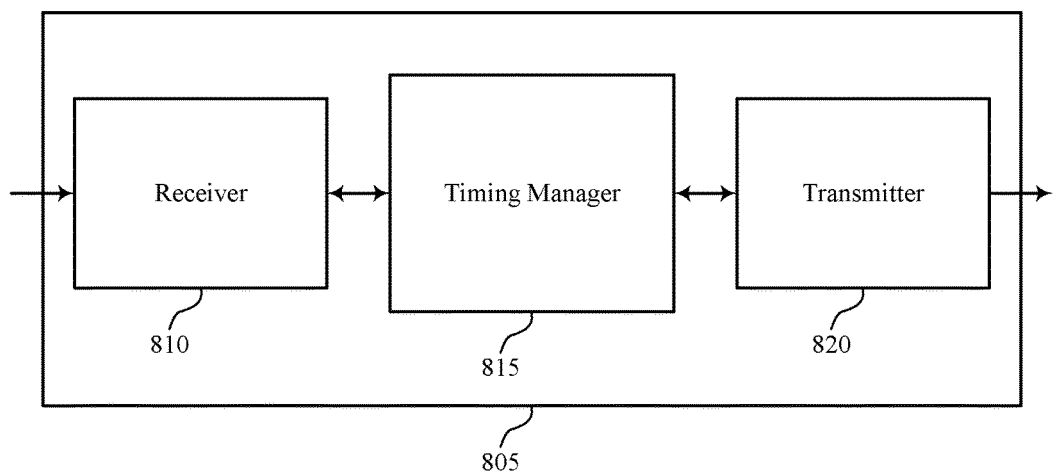
FIGS. 8 through 10 show block diagrams of a device that supports asymmetric downlink-uplink TTI configurations for low latency operation in accordance with aspects of the present disclosure.

FIG. 8 shows a block diagram 800 of a wireless device 805 that supports asymmetric downlink-uplink TTI configurations for low latency operation in accordance with various aspects of the present disclosure. Wireless device 805 may be an example of aspects of a UE 115 or base station 105 as described with reference to FIG. 1. Wireless device 805 may include receiver 810, timing manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to asymmetric downlink-uplink TTI configurations for low latency operation, etc.). Information may be passed on to other components of the device. The receiver 810 may be an example of aspects of the transceiver 1135 described with reference to FIG. 11.

Timing manager 815 may be an example of aspects of the UE timing manager 1115 or a base station timing manager 1215 as described with reference to FIGS. 11 and 12.

Timing manager 815 and/or at least some of its various sub-components may be implemented in hardware, software executed by a processor, firmware, or any combination thereof. If implemented in software executed by a processor, the functions of the timing manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The timing manager 815 and/or at least some of its various sub-components may be physically located at various positions, including being distributed such that portions of functions are implemented at different physical locations by one or more physical devices. In some examples, timing manager 815 and/or at least some of its various sub-components may be a separate and distinct component in accordance with various aspects of the present disclosure. In other examples, timing manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Timing manager 815 may identify a first TTI length for downlink transmissions, identify a second TTI length for uplink transmissions, the second TTI length being different than the first TTI length, determine one or more of a feedback process transmission timing or a TA value based on one or more of the first TTI length or the second TTI length, and transmit a subsequent transmission according to one or more of the feedback process transmission timing or the TA value.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
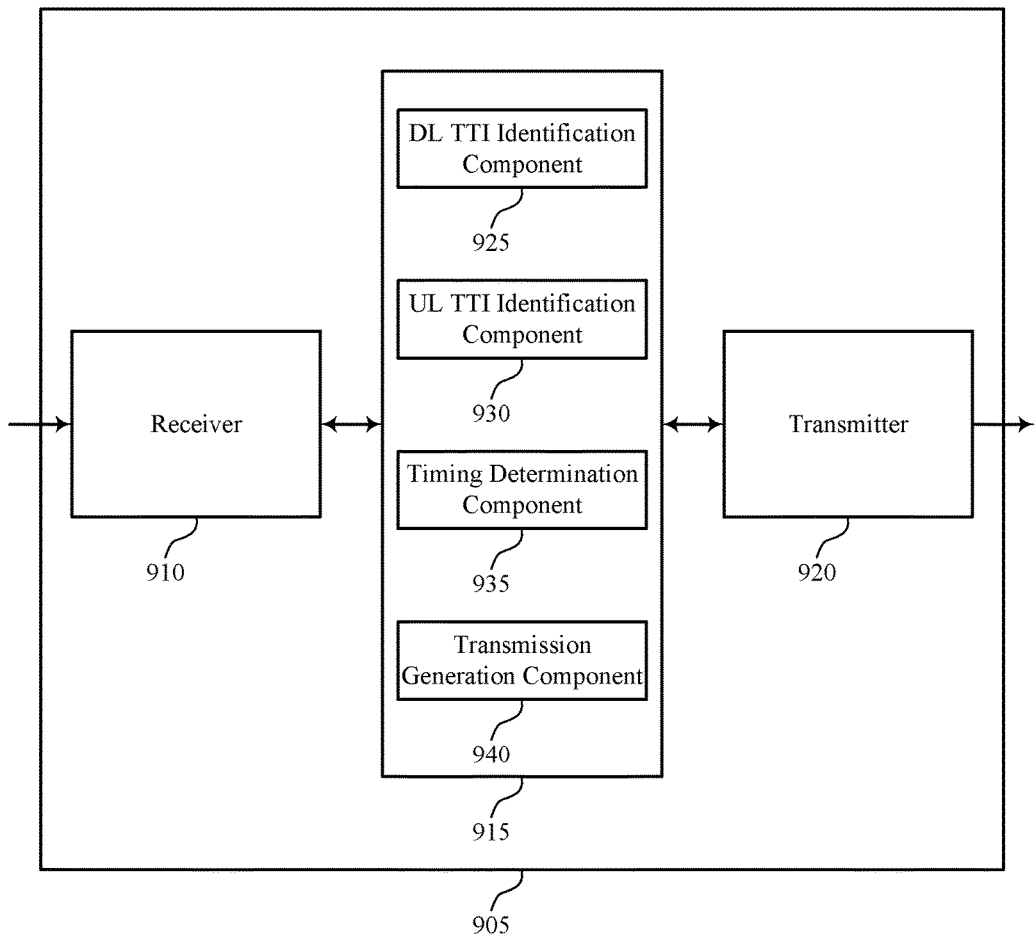

FIG. 9 shows a block diagram 900 of a wireless device 905 that supports asymmetric downlink-uplink TTI configurations for low latency operation in accordance with various aspects of the present disclosure. Wireless device 905 may be an example of aspects of a wireless device 805 or a UE 115 or base station 105 as described with reference to FIGS. 1 and 8. Wireless device 905 may include receiver 910, timing manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to asymmetric downlink-uplink TTI configurations for low latency operation, etc.). Information may be passed on to other components of the device. The receiver 910 may be an example of aspects of the transceiver 1135 described with reference to FIG. 11.

Timing manager 915 may be an example of aspects of the UE timing manager 1115 or a base station timing manager 1215 as described with reference to FIGS. 11 and 12.

Timing manager 915 may also include downlink TTI identification component 925, uplink TTI identification component 930, timing determination component 935, and transmission generation component 940. downlink TTI identification component 925 may identify a first TTI length for downlink transmissions. uplink TTI identification component 930 may identify a second TTI length for uplink transmissions, the second TTI length being different than the first TTI length.

Timing determination component 935 may determine one or more of a feedback process transmission timing or a TA value based on one or more of the first TTI length or the second TTI length. In some cases, timing determination component 935 may shift a start time for the subsequent transmission that includes a new transmission or retransmission to align with a start of a downlink TTI having the first TTI length. In some cases, a start time for the subsequent transmission is shifted to align with a start of an uplink TTI having the second TTI length. In some cases, the second TTI length is selected based on a channel condition for the uplink transmissions.

Transmission generation component 940 may format a subsequent transmission according to one or more of the feedback process transmission timing or the TA value.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
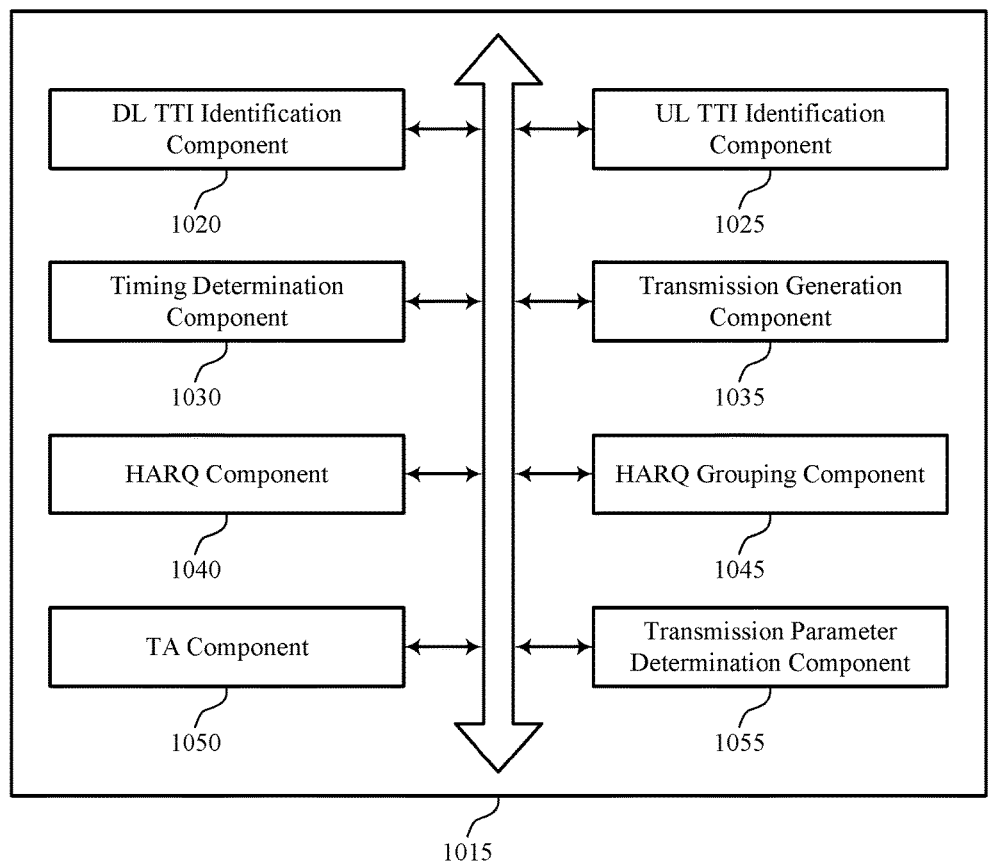

FIG. 10 shows a block diagram 1000 of a timing manager 1015 that supports asymmetric downlink-uplink TTI configurations for low latency operation in accordance with various aspects of the present disclosure. The timing manager 1015 may be an example of aspects of a timing manager 815, a timing manager 915, a UE timing manager 1115, or a base station timing manager 1215, as described with reference to FIGS. 8, 9, 11 and 12. The timing manager 1015 may include downlink TTI identification component 1020, uplink TTI identification component 1025, timing determination component 1030, transmission generation component 1035, HARQ component 1040, HARQ grouping component 1045, TA component 1050, and transmission parameter determination component 1055. Each of these modules may communicate, directly or indirectly, with one another (e.g., via one or more buses).

DL TTI identification component 1020 may identify a first TTI length for downlink transmissions. uplink TTI identification component 1025 may identify a second TTI length for uplink transmissions, the second TTI length being different than the first TTI length.

Timing determination component 1030 may determine one or more of a feedback process transmission timing or a TA value based on one or more of the first TTI length or the second TTI length and in some cases shift a start time for the subsequent transmission that includes the new transmission or retransmission to align with a start of a downlink TTI having the first TTI length. In some cases, a start time for the subsequent transmission is shifted to align with a start of an uplink TTI having the second TTI length. In some cases, the second TTI length is selected based on a channel condition for the uplink transmissions.

Transmission generation component 1035 may transmit a subsequent transmission according to one or more of the feedback process transmission timing or the TA value.

HARQ component 1040 may determine a second HARQ feedback process timing for transmitting HARQ acknowledgement ACK/NACK feedback based on the first TTI length for downlink transmissions, and where the first HARQ process timing and the second HARQ process timing for starting the subsequent transmission are based on different integer numbers of first TTI lengths. In some cases, a HARQ feedback process timing for transmitting ACK/NACK feedback in the subsequent transmission is determined based on the first TTI length for downlink transmissions. In some cases, a HARQ process timing for transmitting a new transmission or a retransmission in the subsequent transmission is determined based on the second TTI length. In some cases, a first HARQ process timing for transmitting a new transmission or a retransmission is determined based on the first TTI length.

HARQ grouping component 1045 may, in cases where first TTI length is shorter than the second TTI length, group ACK/NACK feedback for two or more downlink transmissions to be transmitted in a single subsequent transmission. In some cases, the first TTI length is shorter than the second TTI length, and feedback information for two or more downlink transmissions is grouped for transmission in the subsequent transmission. In some cases, the two or more downlink transmissions are in different subframes and the feedback information is grouped across the different subframes. In some cases, the grouped feedback information is coded for transmission in the subsequent transmission according to a Reed-Muller (RM) coding technique or a turbo coding technique.

TA component 1050 may determine the TA value for the subsequent transmission based on the first TTI length. In some cases, the TA value for the subsequent transmission is determined based on the second TTI length. In some cases, a HARQ process timing or a timing between an uplink grant and the uplink transmissions is determined based on the TA value.

Transmission parameter determination component 1055 may determine, in some cases, one or more parameters for the subsequent transmission based on the first TTI length. In some cases, the one or more parameters for the subsequent transmission include one or more of a TBS, a number of spatial layers for the subsequent transmission, a number of CCs to carry the subsequent transmission, or a CQI reporting type.

Figure 11:
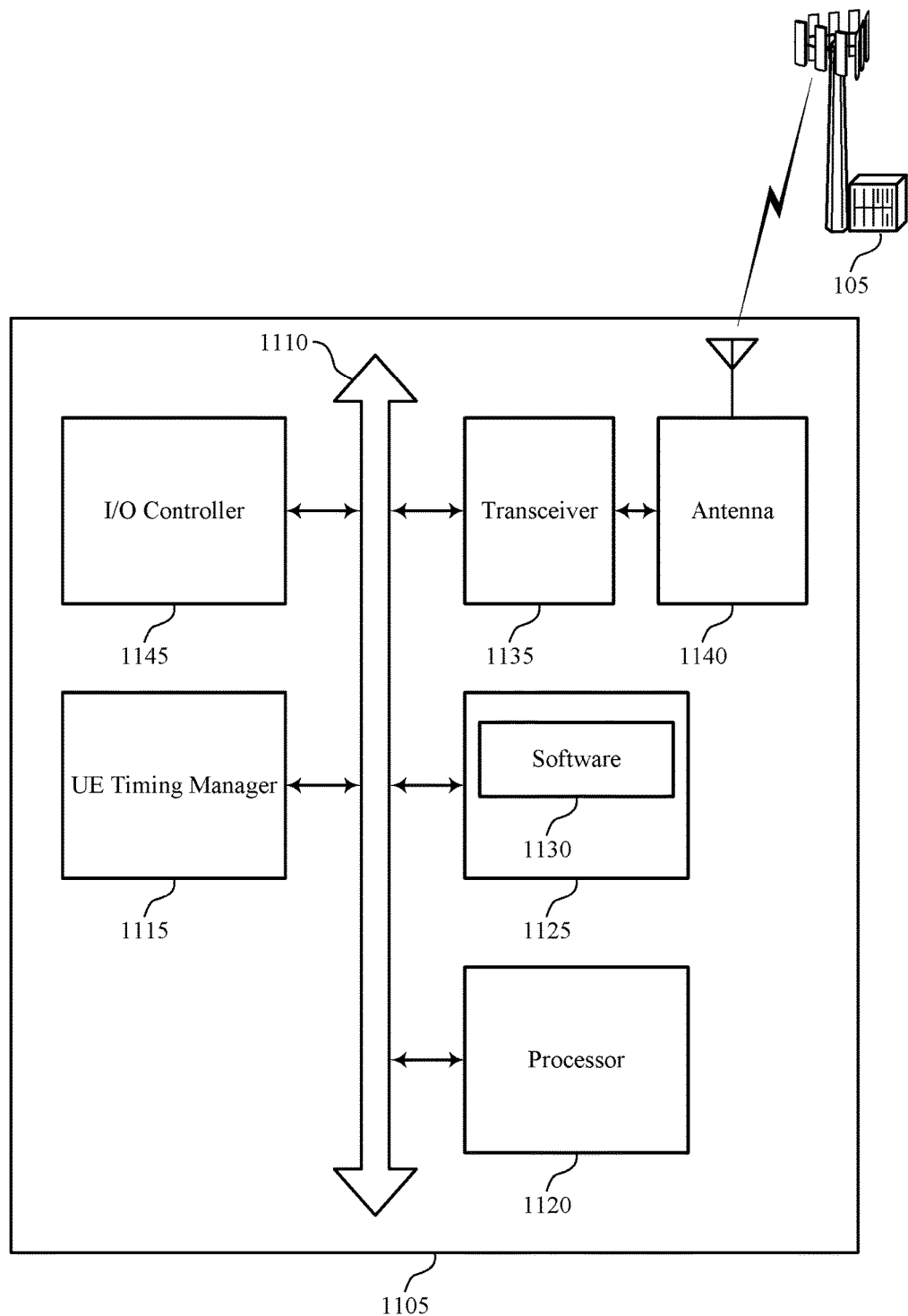
FIG. 11 illustrates a block diagram of a system including a user equipment (UE) that supports asymmetric downlink-uplink TTI configurations for low latency operation in accordance with aspects of the present disclosure.

FIG. 11 shows a diagram of a system 1100 including a device 1105 that supports asymmetric downlink-uplink TTI configurations for low latency operation in accordance with various aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE timing manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting asymmetric downlink-uplink TTI configurations for low latency operation).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support asymmetric downlink-uplink TTI configurations for low latency operation. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
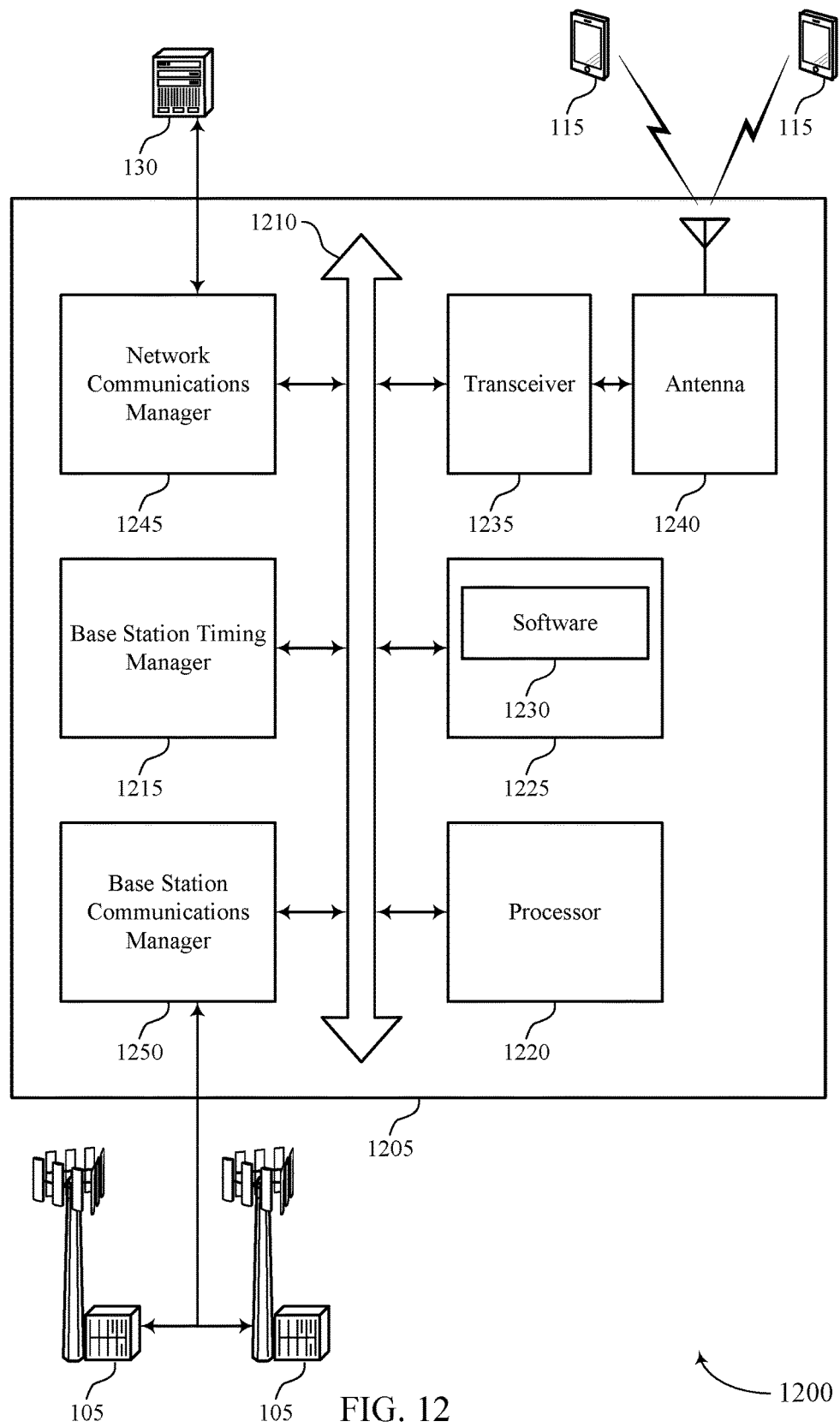
FIG. 12 illustrates a block diagram of a system including a base station that supports asymmetric downlink-uplink TTI configurations for low latency operation in accordance with aspects of the present disclosure.

FIG. 12 shows a diagram of a system 1200 including a device 1205 that supports asymmetric downlink-uplink TTI configurations for low latency operation in accordance with various aspects of the present disclosure. Device 1205 may be an example of or include the components of wireless device 905, wireless device 1105, or a base station 105 as described above, e.g., with reference to FIGS. 1, 9, and 11. Device 1205 may include components for bi-directional voice and data communications including components for transmitting and receiving communications, including base station timing manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting asymmetric downlink-uplink TTI configurations for low latency operation).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support asymmetric downlink-uplink TTI configurations for low latency operation. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an Long Term Evolution (LTE)/LTE-A wireless communication network technology to provide communication between base stations 105.

Figure 13:
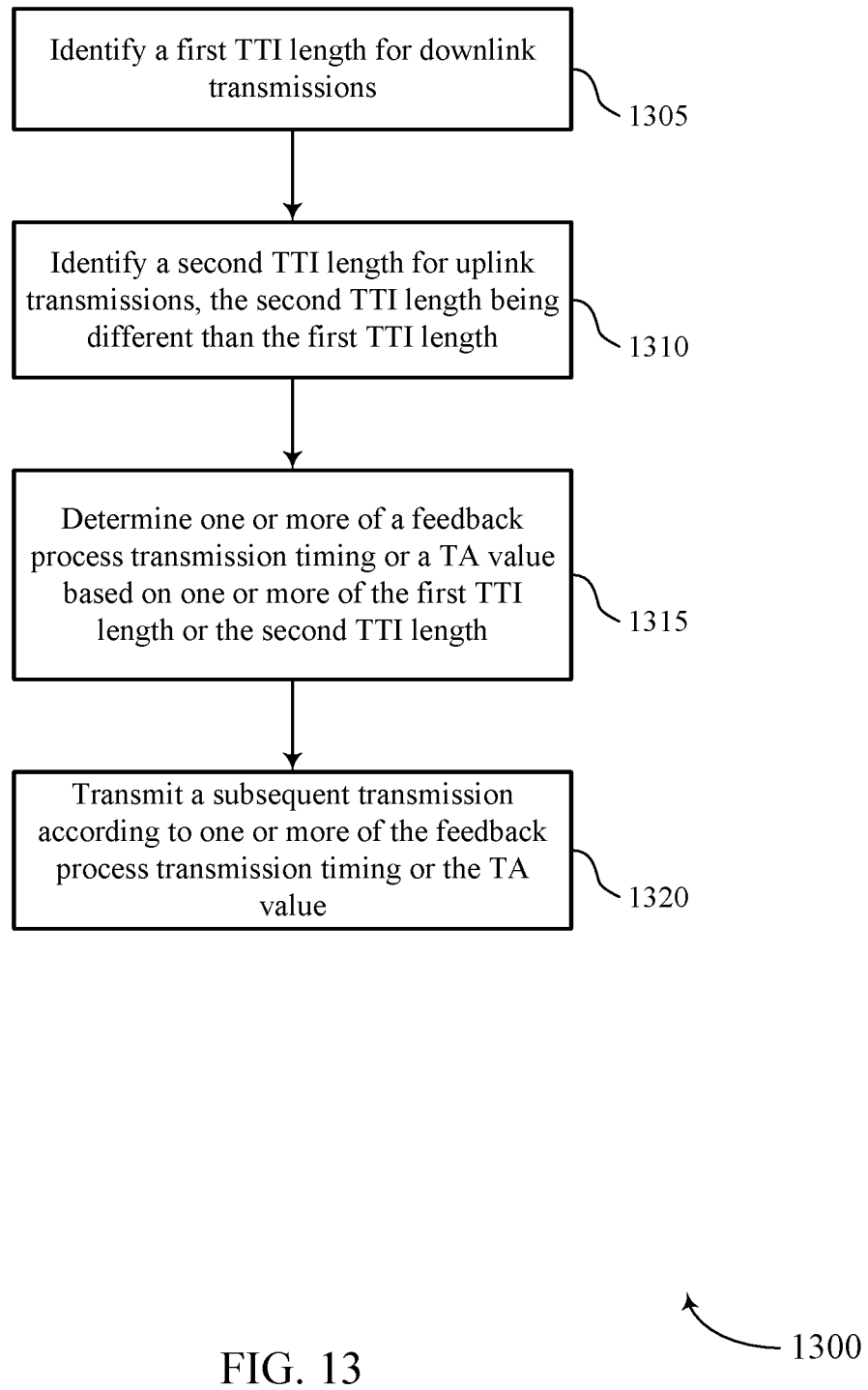
FIGS. 13 through 16 illustrate methods for asymmetric downlink-uplink TTI configurations for low latency operation in accordance with aspects of the present disclosure.

FIG. 13 shows a flowchart illustrating a method 1300 for asymmetric downlink-uplink TTI configurations for low latency operation in accordance with various aspects of the present disclosure. The operations of method 1300 may be implemented by a UE 115 or base station 105 or its components as described herein. For example, the operations of method 1300 may be performed by a timing manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may identify a first TTI length for downlink transmissions. The operations of block 1305 may be performed according to the methods described with reference to FIGS. 1 through 7. In certain examples, aspects of the operations of block 1305 may be performed by a downlink TTI identification component as described with reference to FIGS. 8 through 10.

At block 1310 the UE 115 or base station 105 may identify a second TTI length for uplink transmissions, the second TTI length being different than the first TTI length. The operations of block 1310 may be performed according to the methods described with reference to FIGS. 1 through 7. In certain examples, aspects of the operations of block 1310 may be performed by a uplink TTI identification component as described with reference to FIGS. 8 through 10.

At block 1315 the UE 115 or base station 105 may determine one or more of a feedback process transmission timing or a TA value based at least in part on one or more of the first TTI length or the second TTI length. The operations of block 1315 may be performed according to the methods described with reference to FIGS. 1 through 7. In certain examples, aspects of the operations of block 1315 may be performed by a timing determination component as described with reference to FIGS. 8 through 10.

At block 1320 the UE 115 or base station 105 may transmit a subsequent transmission according to one or more of the feedback process transmission timing or the TA value. The operations of block 1320 may be performed according to the methods described with reference to FIGS. 1 through 7. In certain examples, aspects of the operations of block 1320 may be performed by a transmission generation component as described with reference to FIGS. 8 through 10.

Figure 14:
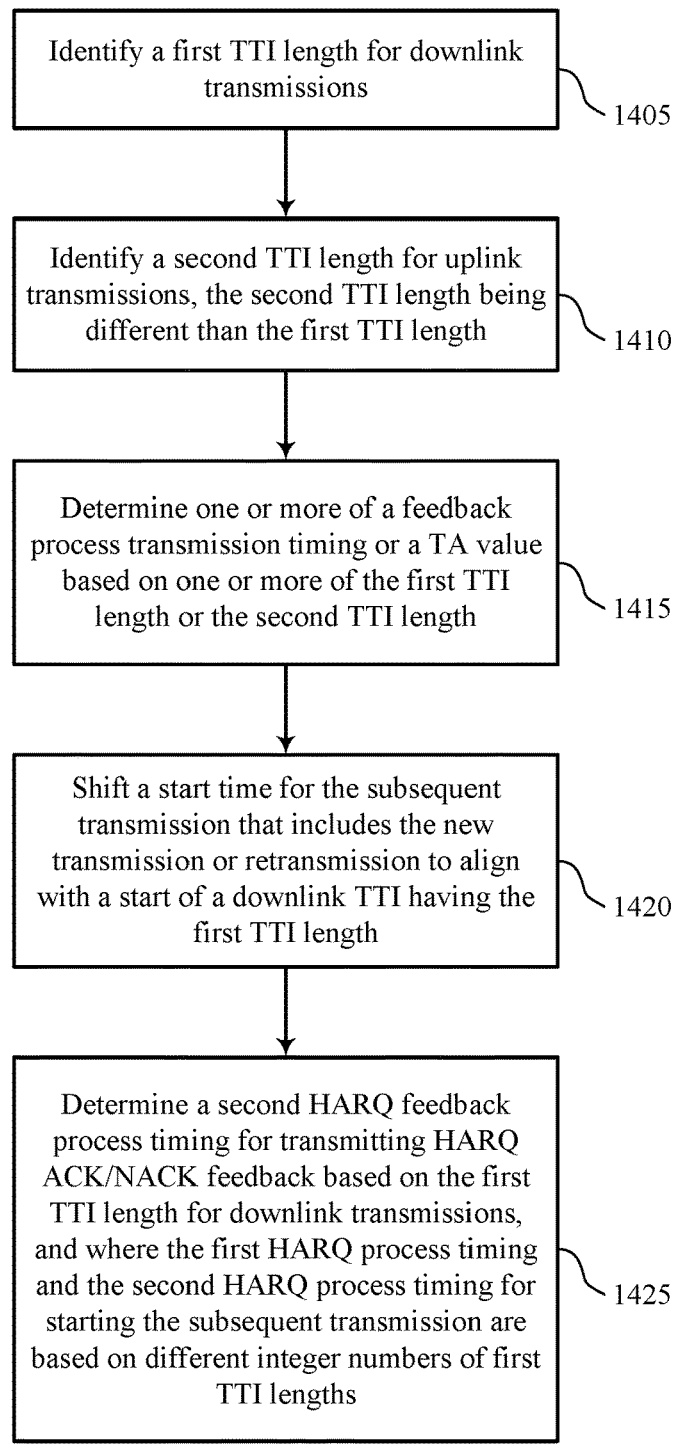

FIG. 14 shows a flowchart illustrating a method 1400 for asymmetric downlink-uplink TTI configurations for low latency operation in accordance with various aspects of the present disclosure. The operations of method 1400 may be implemented by a UE 115 or base station 105 or its components as described herein. For example, the operations of method 1400 may be performed by a timing manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify a first TTI length for downlink transmissions. The operations of block 1405 may be performed according to the methods described with reference to FIGS. 1 through 7. In certain examples, aspects of the operations of block 1405 may be performed by a downlink TTI identification component as described with reference to FIGS. 8 through 10.

At block 1410 the UE 115 or base station 105 may identify a second TTI length for uplink transmissions, the second TTI length being different than the first TTI length. The operations of block 1410 may be performed according to the methods described with reference to FIGS. 1 through 7. In certain examples, aspects of the operations of block 1410 may be performed by a uplink TTI identification component as described with reference to FIGS. 8 through 10.

At block 1415 the UE 115 or base station 105 may determine one or more of a feedback process transmission timing or a TA value based at least in part on one or more of the first TTI length or the second TTI length. The operations of block 1415 may be performed according to the methods described with reference to FIGS. 1 through 7. In certain examples, aspects of the operations of block 1415 may be performed by a timing determination component as described with reference to FIGS. 8 through 10.

At block 1420 the UE 115 or base station 105 may shift a start time for the subsequent transmission that includes the new transmission or retransmission to align with a start of a downlink TTI having the first TTI length. The operations of block 1420 may be performed according to the methods described with reference to FIGS. 1 through 7. In certain examples, aspects of the operations of block 1420 may be performed by a timing determination component as described with reference to FIGS. 8 through 10.

At block 1425 the UE 115 or base station 105 may determine a second HARQ feedback process timing for transmitting HARQ ACK/NACK feedback based on the first TTI length for downlink transmissions, and where the first HARQ process timing and the second HARQ process timing for starting the subsequent transmission are based on different integer numbers of first TTI lengths. The operations of block 1425 may be performed according to the methods described with reference to FIGS. 1 through 7. In certain examples, aspects of the operations of block 1425 may be performed by a HARQ component as described with reference to FIGS. 8 through 10.

Figure 15:
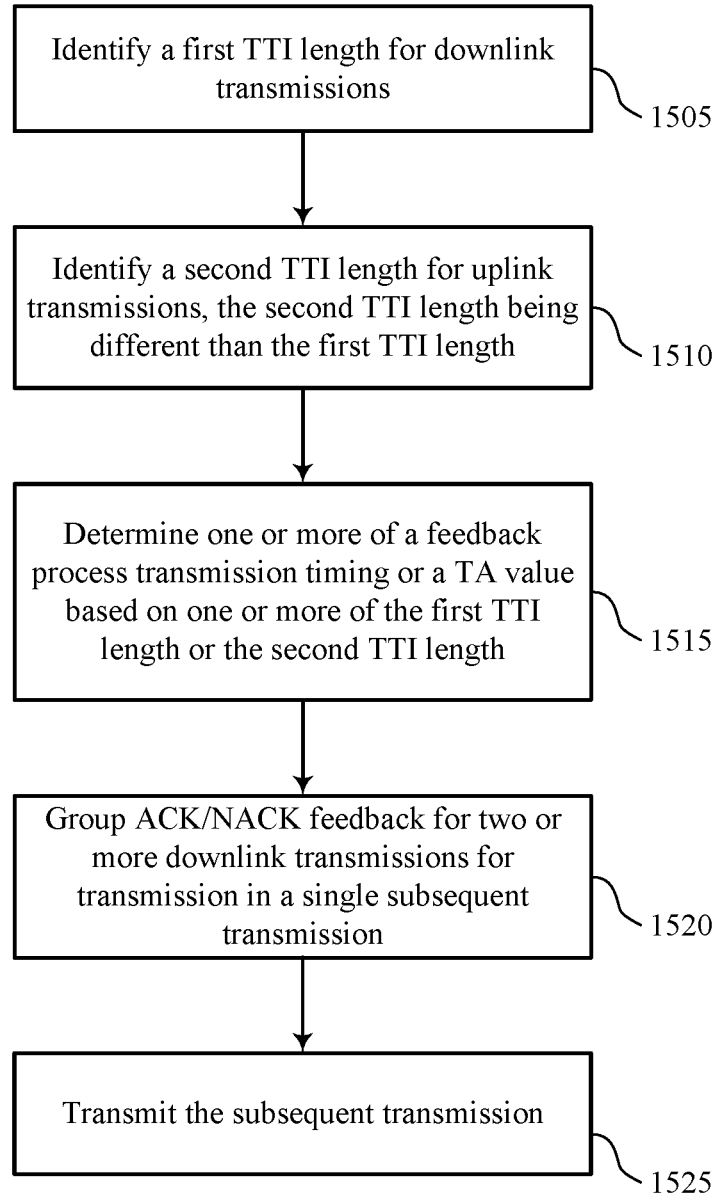

FIG. 15 shows a flowchart illustrating a method 1500 for asymmetric downlink-uplink TTI configurations for low latency operation in accordance with various aspects of the present disclosure. The operations of method 1500 may be implemented by a UE 115 or base station 105 or its components as described herein. For example, the operations of method 1500 may be performed by a timing manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may identify a first TTI length for downlink transmissions. The operations of block 1505 may be performed according to the methods described with reference to FIGS. 1 through 7. In certain examples, aspects of the operations of block 1505 may be performed by a downlink TTI identification component as described with reference to FIGS. 8 through 10.

At block 1510 the UE 115 or base station 105 may identify a second TTI length for uplink transmissions, the second TTI length being different than the first TTI length. The operations of block 1510 may be performed according to the methods described with reference to FIGS. 1 through 7. In certain examples, aspects of the operations of block 1510 may be performed by a uplink TTI identification component as described with reference to FIGS. 8 through 10.

At block 1515 the UE 115 or base station 105 may determine one or more of a feedback process transmission timing or a TA value based at least in part on one or more of the first TTI length or the second TTI length. The operations of block 1515 may be performed according to the methods described with reference to FIGS. 1 through 7. In certain examples, aspects of the operations of block 1515 may be performed by a timing determination component as described with reference to FIGS. 8 through 10.

At block 1520 the UE 115 or base station 105 may group ACK/NACK feedback for two or more downlink transmissions for transmission in a single subsequent transmission. The operations of block 1520 may be performed according to the methods described with reference to FIGS. 1 through 7. In certain examples, aspects of the operations of block 1520 may be performed by a transmission generation component as described with reference to FIGS. 8 through 10.

At block 1525 the UE 115 or base station 105 may transmit the subsequent transmission. The operations of block 1525 may be performed according to the methods described with reference to FIGS. 1 through 7. In certain examples, aspects of the operations of block 1525 may be performed by a transmission generation component as described with reference to FIGS. 8 through 10, in conjunction with the transmitter.

Figure 16:
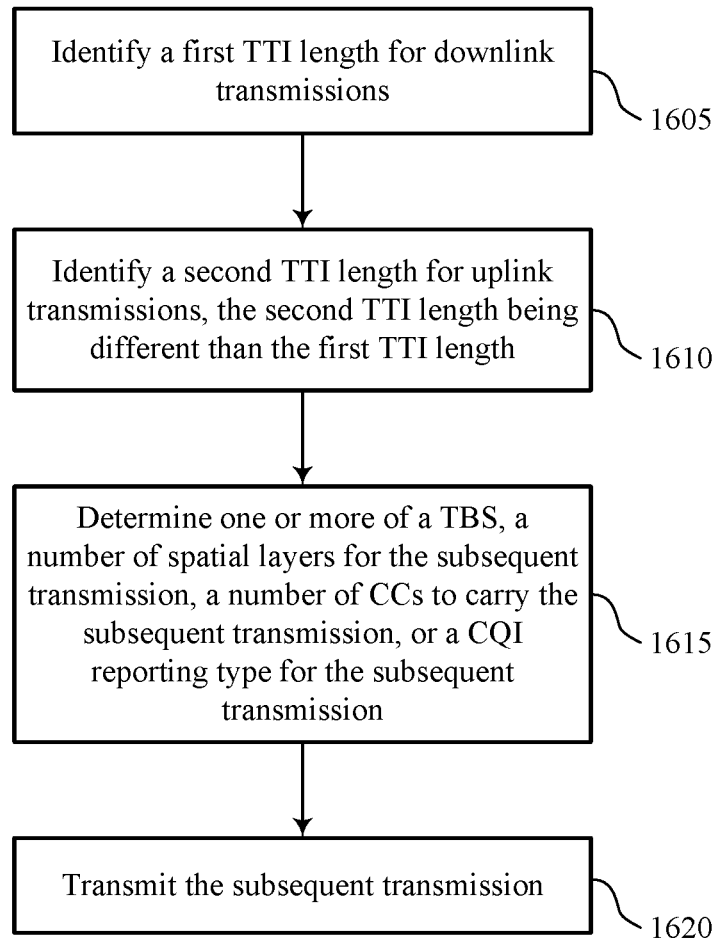

FIG. 16 shows a flowchart illustrating a method 1600 for asymmetric downlink-uplink TTI configurations for low latency operation in accordance with various aspects of the present disclosure. The operations of method 1600 may be implemented by a UE 115 or base station 105 or its components as described herein. For example, the operations of method 1600 may be performed by a timing manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1605 the UE 115 or base station 105 may identify a first TTI length for downlink transmissions. The operations of block 1605 may be performed according to the methods described with reference to FIGS. 1 through 7. In certain examples, aspects of the operations of block 1605 may be performed by a downlink TTI identification component as described with reference to FIGS. 8 through 10.

At block 1610 the UE 115 or base station 105 may identify a second TTI length for uplink transmissions, the second TTI length being different than the first TTI length. The operations of block 1610 may be performed according to the methods described with reference to FIGS. 1 through 7. In certain examples, aspects of the operations of block 1610 may be performed by a uplink TTI identification component as described with reference to FIGS. 8 through 10.

At block 1615 the UE 115 or base station 105 may determine one or more of a TBS, a number of spatial layers for the subsequent transmission, a number of CCs to carry the subsequent transmission, or a CQI reporting type for the subsequent transmission. The operations of block 1615 may be performed according to the methods described with reference to FIGS. 1 through 7. In certain examples, aspects of the operations of block 1615 may be performed by a transmission parameter determination component as described with reference to FIGS. 8 through 10.

At block 1620 the UE 115 or base station 105 may transmit the subsequent transmission. The operations of block 1620 may be performed according to the methods described with reference to FIGS. 1 through 7. In certain examples, aspects of the operations of block 1620 may be performed by a transmission generation component as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a first transmission time interval (TTI) length for downlink transmissions;
    identifying a second TTI length for uplink transmissions, the second TTI length being longer than the first TTI length;
    determining a feedback process transmission timing based at least in part on one or more of the first TTI length or the second TTI length;
    grouping feedback information for two or more consecutive downlink transmissions for transmission in a subsequent transmission; and
    transmitting the subsequent transmission according to the feedback process transmission timing.

2. The method of claim 1, wherein the determining comprises:
    determining a hybrid automatic repeat request (HARQ) feedback process timing for transmitting acknowledgment/negative-acknowledgment (ACK/NACK) feedback in the subsequent transmission based on the first TTI length for downlink transmissions.

3. The method of claim 2, wherein the determining further comprises:
    shifting a start time for the subsequent transmission to align with a start of an uplink TTI having the second TTI length.

4. The method of claim 1, wherein the determining comprises:
    determining a hybrid automatic repeat request (HARQ) process timing for transmitting a new transmission or a retransmission in the subsequent transmission based on the second TTI length.

5. The method of claim 1, wherein the determining comprises:
    determining a first hybrid automatic repeat request (HARQ) process timing for transmitting a new transmission or a retransmission based on the first TTI length.

6. The method of claim 5, wherein the determining further comprises:
    shifting a start time for the subsequent transmission that includes the new transmission or retransmission to align with a start of a downlink TTI having the first TTI length.

7. The method of claim 5, wherein the determining further comprises:
    determining a second HARQ feedback process timing for transmitting HARQ acknowledgment/negative-acknowledgment (ACK/NACK) feedback based on the first TTI length for downlink transmissions, and
    wherein the first HARQ feedback process timing and the second HARQ feedback process timing for starting the subsequent transmission are based on different integer numbers of first TTI lengths.

8. The method of claim 1, wherein acknowledgment/negative-acknowledgment (ACK/NACK) feedback for the two or more consecutive downlink transmissions are transmitted in a single subsequent transmission.

9. The method of claim 1, further comprising:
determining one or more parameters for the subsequent transmission based at least in part on the first TTI length, wherein the one or more parameters for the subsequent transmission include one or more of a timing advance (TA) value, a transport block size (TBS), a number of spatial layers for the subsequent transmission, a number of component carriers (CCs) to carry the subsequent transmission, or a channel quality information (CQI) reporting type.

10. The method of claim 1, wherein the determining comprises:
determining a timing advance (TA) value for the subsequent transmission based on the second TTI length.

11. The method of claim 10, wherein the determining further comprises:
determining a hybrid automatic repeat request (HARQ) process timing or a timing between an uplink grant and the uplink transmissions based at least in part on the TA value.

12. The method of claim 1, wherein the two or consecutive more downlink transmissions are in different subframes.

13. The method of claim 1, further comprising:
coding the feedback information from the two or more consecutive downlink transmissions for transmission in the subsequent transmission according to a Reed-Muller (RM) coding technique or a turbo coding technique.

14. The method of claim 1, wherein the second TTI length is selected based at least in part on a channel condition for the uplink transmissions.

15. An apparatus for wireless communication, comprising:
means for identifying a first TTI length for downlink transmissions;
means for identifying a second TTI length for uplink transmissions, the second TTI length being longer than the first TTI length;
means for determining a feedback process transmission timing based at least in part on one or more of the first TTI length or the second TTI length;
means for grouping feedback information for two or more consecutive downlink transmissions for transmission in a subsequent transmission; and
means for transmitting the subsequent transmission according to the feedback process transmission timing.

16. An apparatus for wireless communication, in a system comprising:
a processor;
memory in electronic communication with the processor; and
instructions stored in the memory and operable, when executed by the processor, to cause the apparatus to:
identify a first TTI length for downlink transmissions;
identify a second TTI length for uplink transmissions, the second TTI length being longer than the first TTI length;
determine a feedback process transmission timing based at least in part on one or more of the first TTI length or the second TTI length;
group feedback information for two or more consecutive downlink transmissions for transmission in a subsequent transmission; and
transmit the subsequent transmission according to the feedback process transmission timing.

17. The apparatus of claim 16, wherein the instructions are executable by the processor to cause the apparatus to:
determine a hybrid automatic repeat request (HARQ) feedback process timing for transmitting acknowledgment/negative-acknowledgment (ACK/NACK) feedback in the subsequent transmission based on the first TTI length for downlink transmissions.

18. The apparatus of claim 17, wherein the instructions are executable by the processor to cause the apparatus to:
shift a start time for the subsequent transmission to align with a start of an uplink TTI having the second TTI length.

19. The apparatus of claim 16, wherein the instructions are executable by the processor to cause the apparatus to:
determine a hybrid automatic repeat request (HARQ) process timing for transmitting a new transmission or a retransmission in the subsequent transmission based on the second TTI length.

20. The apparatus of claim 16, wherein the instructions are executable by the processor to cause the apparatus to:
determine a first hybrid automatic repeat request (HARQ) process timing for transmitting a new transmission or a retransmission based on the first TTI length.

21. The apparatus of claim 20, wherein the instructions are executable by the processor to cause the apparatus to:
shift a start time for the subsequent transmission that includes the new transmission or retransmission to align with a start of a downlink TTI having the first TTI length.

22. The apparatus of claim 20, wherein the instructions are executable by the processor to cause the apparatus to:
determine a second HARQ feedback process timing for transmitting HARQ acknowledgment/negative-acknowledgment (ACK/NACK) feedback based on the first TTI length for downlink transmissions, and
wherein the first HARQ feedback process timing and the second HARQ feedback process timing for starting the subsequent transmission are based on different integer numbers of first TTI lengths.

23. The apparatus of claim 16, wherein acknowledgment/negative-acknowledgment (ACK/NACK) feedback for the two or more consecutive downlink transmissions are transmitted in a single subsequent transmission.

24. The apparatus of claim 16, wherein the instructions are executable by the processor to cause the apparatus to:
determine one or more parameters for the subsequent transmission based at least in part on the first TTI length, wherein the one or more parameters for the subsequent transmission include one or more of a timing advance (TA) value, a transport block size (TBS), a number of spatial layers for the subsequent transmission, a number of component carriers (CCs) to carry the subsequent transmission, or a channel quality information (CQI) reporting type.

25. The apparatus of claim 16, wherein the instructions are executable by the processor to cause the apparatus to:
determine a timing advance (TA) value for the subsequent transmission based on the second TTI length.

26. The apparatus of claim 16, wherein the two or more consecutive downlink transmissions are in different subframes.

27. The apparatus of claim 16, wherein the instructions are executable by the processor to cause the apparatus to:
code the feedback information from the two or more consecutive downlink transmissions for transmission in the subsequent transmission according to a Reed-Muller (RM) coding technique or a turbo coding technique.

28. A non-transitory computer readable medium storing code for wireless communication, the code comprising instructions executable by a processor to:
identify a first TTI length for downlink transmissions;
identify a second TTI length for uplink transmissions, the second TTI length being longer than the first TTI length;
determine a feedback process transmission timing based at least in part on one or more of the first TTI length or the second TTI length;
group feedback information for two or more consecutive downlink transmissions for transmission in a subsequent transmission; and
transmit the subsequent transmission according to the feedback process transmission timing.

\* \* \* \* \*